(12) United States Patent
Badger

(10) Patent No.: US 12,086,087 B2
(45) Date of Patent: *Sep. 10, 2024

(54) METHODS AND APPARATUS FOR NETWORK INTERFACE FABRIC OPERATIONS

(71) Applicant: GigaIO Networks, Inc., Carlsbad, CA (US)

(72) Inventor: Eric Badger, San Diego, CA (US)

(73) Assignee: GigaIO Networks, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/826,024

(22) Filed: May 26, 2022

(65) Prior Publication Data

US 2022/0294743 A1 Sep. 15, 2022

Related U.S. Application Data

(63) Continuation of application No. 17/016,228, filed on Sep. 9, 2020, now Pat. No. 11,403,247.
(Continued)

(51) Int. Cl.
*G06F 3/06* (2006.01)
*G06F 9/54* (2006.01)
(Continued)

(52) U.S. Cl.
CPC .......... *G06F 13/4022* (2013.01); *G06F 9/545* (2013.01); *G06F 9/546* (2013.01);
(Continued)

(58) Field of Classification Search
None
See application file for complete search history.

(56) References Cited

U.S. PATENT DOCUMENTS 5,903,627 A * 5/1999 Shaffer .................. H04M 3/53
379/88.01
6,721,316 B1 4/2004 Epps et al.
(Continued)

FOREIGN PATENT DOCUMENTS

CN 100401709 C 7/2008
CN 102196503 A 9/2011
(Continued)

OTHER PUBLICATIONS

Buntinas D., et al., "Implementation and Evaluation of Shared-Memory Communication and Synchronization Operations in MPICH2 using the Nemesis Communication Subsystem," Parallel Computing, Jun. 2007, pp. 1-17. URL: <url: https://www.mcs.anl.gov/uploads/cels/papers/P1346A.pdf.
(Continued)

*Primary Examiner* — Hyun Nam
(74) *Attorney, Agent, or Firm* — Patent Beach PC

(57) ABSTRACT

Methods and apparatus for improved send/receive operations in network interface fabrics. In one exemplary embodiment, mechanisms and protocols for enhanced inter-process (and inter-endpoint) communication, including within very large scale topologies involving e.g., hundreds or even thousands of nodes or endpoints, such as a large-scale high-performance compute or network fabric, are described. In one implementation, the methods and apparatus avoid frequent kernel transitions (and the performance penalties associated therewith) associated with prior approaches through use of UMCs (user message contexts) are created, which contain TX and RX queues that can be read and written directly from user space. A KMC (kernel message context) is also used, in which TX queues are written from the kernel such that access can be arbitrated between unrelated processes. These functions allow for, among other
(Continued)

things, significant portions of the foregoing kernel accesses to be obviated.

19 Claims, 16 Drawing Sheets

Related U.S. Application Data

(60) Provisional application No. 62/898,489, filed on Sep. 10, 2019.

(51) Int. Cl.
*G06F 13/28* (2006.01)
*G06F 13/40* (2006.01)
*H04L 47/62* (2022.01)
*H04L 47/625* (2022.01)
*H04L 47/6295* (2022.01)

(52) U.S. Cl.
CPC .......... *G06F 13/28* (2013.01); *H04L 47/6215* (2013.01); *H04L 47/6255* (2013.01); *H04L 47/6295* (2013.01); *G06F 2213/0026* (2013.01)

(56) References Cited

U.S. PATENT DOCUMENTS

| | | | |
|---|---|---|---|
| 7,991,918 B2 | 8/2011 | Jha et al. | |
| 8,037,345 B1 | 10/2011 | Iyer et al. | |
| 8,271,996 B1 | 9/2012 | Gould et al. | |
| 8,429,325 B1 | 4/2013 | Onufryk et al. | |
| 8,458,267 B2* | 6/2013 | Chen | G06F 11/3409 709/206 |
| 8,463,934 B2 | 6/2013 | Maitra | |
| 8,868,777 B2 | 10/2014 | Maitra | |
| 8,949,483 B1 | 2/2015 | Martin | |
| 9,152,597 B2 | 10/2015 | Maitra | |
| 9,223,737 B1 | 12/2015 | Serebrin | |
| 9,448,957 B2 | 9/2016 | Maitra | |
| 9,450,780 B2 | 9/2016 | Wang et al. | |
| 9,626,324 B2 | 4/2017 | Chawla et al. | |
| 10,756,816 B1 | 8/2020 | Dreier | |
| 10,887,238 B2 | 1/2021 | Ramey et al. | |
| 11,403,247 B2 | 8/2022 | Badger | |
| 11,593,291 B2 | 2/2023 | Pilmore | |
| 11,915,026 B1* | 2/2024 | Chandrashekar | G06F 9/4881 |
| 2001/0026546 A1 | 10/2001 | Schieder et al. | |
| 2002/0012356 A1 | 1/2002 | Li et al. | |
| 2002/0016940 A1* | 2/2002 | Ju | G06F 9/545 714/718 |
| 2002/0133618 A1* | 9/2002 | Desai | H04L 12/2861 709/239 |
| 2003/0105826 A1* | 6/2003 | Mayraz | G06F 16/9535 709/206 |
| 2003/0172224 A1 | 9/2003 | Gulick et al. | |
| 2004/0090919 A1 | 5/2004 | Callon et al. | |
| 2004/0095883 A1 | 5/2004 | Chu et al. | |
| 2004/0125804 A1 | 7/2004 | Lee | |
| 2005/0160313 A1* | 7/2005 | Wu | G06F 11/2056 714/13 |
| 2006/0174251 A1 | 8/2006 | Pope et al. | |
| 2006/0239287 A1 | 10/2006 | Johnsen et al. | |
| 2006/0242330 A1 | 10/2006 | Torudbakken et al. | |
| 2006/0282603 A1 | 12/2006 | Onufryk et al. | |
| 2006/0288129 A1 | 12/2006 | Pope et al. | |
| 2008/0010648 A1 | 1/2008 | Ando et al. | |
| 2008/0092148 A1 | 4/2008 | Moertl et al. | |
| 2008/0186917 A1 | 8/2008 | Wu et al. | |
| 2009/0077277 A1 | 3/2009 | Vidal et al. | |
| 2009/0125666 A1 | 5/2009 | Freking et al. | |
| 2009/0199296 A1* | 8/2009 | Xie | G06F 21/316 726/23 |
| 2009/0240874 A1 | 9/2009 | Pong | |
| 2009/0248947 A1 | 10/2009 | Malwankar et al. | |
| 2010/0064079 A1 | 3/2010 | Harvey et al. | |
| 2010/0085981 A1* | 4/2010 | Gupta | H04L 45/245 370/419 |
| 2011/0202701 A1 | 8/2011 | Maitra | |
| 2011/0219421 A1* | 9/2011 | Ullman | H04N 21/84 725/117 |
| 2011/0258337 A1* | 10/2011 | Wang | H04L 65/65 709/231 |
| 2011/0302349 A1 | 12/2011 | Griggs | |
| 2012/0033680 A1 | 2/2012 | Gopinath et al. | |
| 2012/0166690 A1 | 6/2012 | Regula | |
| 2012/0281536 A1 | 11/2012 | Gell et al. | |
| 2013/0212165 A1 | 8/2013 | Vermeulen et al. | |
| 2013/0290967 A1 | 10/2013 | Calciu et al. | |
| 2014/0181454 A1 | 6/2014 | Manula et al. | |
| 2014/0219276 A1* | 8/2014 | Jokinen | H04L 47/62 370/392 |
| 2014/0237156 A1 | 8/2014 | Regula et al. | |
| 2014/0344947 A1 | 11/2014 | Kalyanasundharam et al. | |
| 2014/0372657 A1 | 12/2014 | Jones et al. | |
| 2015/0026384 A1 | 1/2015 | Maitra | |
| 2015/0143016 A1 | 5/2015 | Egi et al. | |
| 2015/0222705 A1 | 8/2015 | Stephens | |
| 2015/0261709 A1 | 9/2015 | Billi | |
| 2016/0103783 A1 | 4/2016 | Allen et al. | |
| 2016/0134564 A1 | 5/2016 | Egi et al. | |
| 2016/0147676 A1 | 5/2016 | Cha et al. | |
| 2016/0154756 A1 | 6/2016 | Dodson et al. | |
| 2016/0156973 A1* | 6/2016 | Ullman | H04N 21/4755 725/14 |
| 2016/0328339 A1 | 11/2016 | Ozguner et al. | |
| 2017/0070363 A1 | 3/2017 | Watkins et al. | |
| 2017/0206169 A1* | 7/2017 | Coppola | G06F 9/545 |
| 2017/0264571 A1* | 9/2017 | Aibester | H04L 49/9005 |
| 2018/0083908 A1* | 3/2018 | Dotan-Cohen | G06Q 10/107 |
| 2018/0095974 A1 | 4/2018 | Kondiles et al. | |
| 2018/0159781 A1 | 6/2018 | Mehta et al. | |
| 2018/0247187 A1 | 8/2018 | Chung et al. | |
| 2018/0341619 A1 | 11/2018 | Slik | |
| 2019/0163378 A1 | 5/2019 | Carlough et al. | |
| 2019/0230161 A1* | 7/2019 | Romem | G06F 3/0665 |
| 2019/0324882 A1* | 10/2019 | Borello | G06F 9/5077 |
| 2020/0081858 A1 | 3/2020 | Philmore et al. | |
| 2020/0117676 A1 | 4/2020 | Ben Moshe et al. | |
| 2020/0117844 A1 | 4/2020 | Choi et al. | |
| 2020/0310994 A1 | 10/2020 | Chofleming et al. | |
| 2021/0073158 A1* | 3/2021 | Badger | H04L 47/6215 |
| 2021/0075745 A1 | 3/2021 | Badger | |
| 2021/0103535 A1 | 4/2021 | Badger | |
| 2021/0124706 A1 | 4/2021 | Meyer | |

FOREIGN PATENT DOCUMENTS

| | | |
|---|---|---|
| CN | 103353851 A | 10/2013 |
| CN | 106850803 A | 6/2017 |
| CN | 112579263 A | 3/2021 |
| EP | 3033681 A1 | 6/2016 |
| EP | 3850493 A1 | 7/2021 |
| EP | 4028859 A1 | 7/2022 |
| EP | 4029219 A1 | 7/2022 |
| EP | 4038494 A2 | 8/2022 |
| JP | 3809674 B2 | 8/2006 |
| WO | WO-2008157470 A1 | 12/2008 |
| WO | WO-2009120798 A2 | 10/2009 |
| WO | WO-2018102276 A1 | 6/2018 |
| WO | WO-2020055921 A1 | 5/2020 |
| WO | WO-2021050762 A1 | 3/2021 |
| WO | WO-2021050763 A1 | 3/2021 |
| WO | WO-2021067818 A2 | 4/2021 |
| WO | WO-2021081409 A1 | 4/2021 |

OTHER PUBLICATIONS

Dittia Z., et al., "DMA Mechanisms for High Performance Network Interfaces," 2007, 15 pages. [Retrieved from Internet] (URL: https://www.semanticscholar.org/paper/DMA-Mechanisms-for-High-Performance-Network-Dittia-Cox/23fae6a2d6ce3ce922fc8571e0ada0519ffe8057).

(56) References Cited

OTHER PUBLICATIONS

Katsinis C., et al., "The Performance of Parallel Matrix Algorithms on a Broadcast-based Architecture", Concurrency and Computation: Practice and Experience, vol. 18(3), 2005, pp. 271-303.
Kristiansen, L.B., "PCIe Device Lending: Using Non-Transparent Bridges to Share Devices," Master's Thesis Spring 2015, UiO Department of Informatics, University of Oslo, 96 pages.
PCI Express Base Specification Version 1.0a, 2003.
PCI Express Base Specification Version 1.1 dated Mar. 8, 2005, 508 pages.
PCI Express Base Specification Version 2.0 dated Dec. 20, 2006, 608 pages.
PCI Express Base Specification Version 2.1 dated Mar. 4, 2009, 704 pages.
PCI Express Base Specification Version 3.0 dated Oct. 23, 2014, 860 pages.
PCI Express Base Specification Version 3.1 dated Dec. 7, 2015, 1075 pages.
PCI Express Base Specification Version 5.0 dated Jun. 5, 2018, 1311 pages.
PCI Express Base Specification Revision 4.0 dated Oct. 5, 2017, 1354 pages.
Shipman G. M., et al., "Investigations on InfiniBand: Efficient Network Buffer Utilization at Scale," Investigations on InfiniBand, 2007, pp. 178-186. URL: <url: http://citeseerx.ist.psu.edu/viewdoc/download?doi=10.1.1.89.3001&rep=rep1&type=pdf.
Tu C., et al., "Marlin: A Memory-Based Rack Area Network," IEEE Xplore, 2014, 11 pages.
Yu, W., et al., "Adaptive Connection Management for Scalable MPI over InfiniBand," IEEE Xplore, Jun. 2006, pp. 1-10. URL: <url: https://ieeexplore.ieee.org/document/1639338.

\* cited by examiner

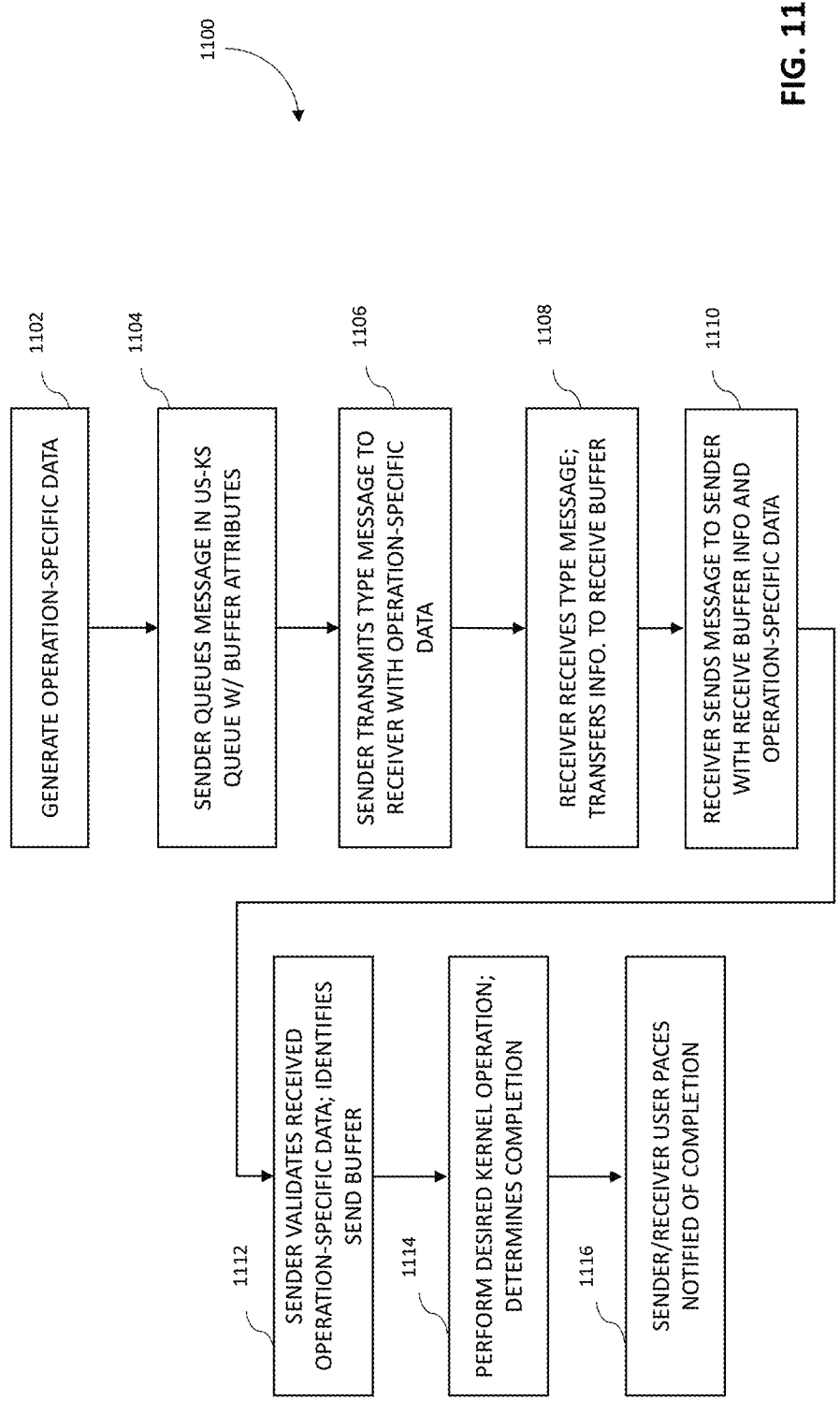

METHODS AND APPARATUS FOR NETWORK INTERFACE FABRIC OPERATIONS

PRIORITY AND RELATED APPLICATIONS

This application is a continuation of and claims priority to U.S. patent application Ser. No. 17/016,228 entitled "METHODS AND APPARATUS FOR NETWORK INTERFACE FABRIC SEND/RECEIVE OPERATIONS" filed Sep. 9, 2020, which claims the benefit of priority to U.S. Provisional Patent Application Ser. No. 62/898,489 filed Sep. 10, 2019 and entitled "METHODS AND APPARATUS FOR NETWORK INTERFACE FABRIC SEND/RECEIVE OPERATIONS", each of the foregoing which is incorporated herein by reference in its entirety.

This application is related to U.S. patent application Ser. No. 16/566,829 filed Sep. 10, 2019 and entitled "METHODS AND APPARATUS FOR HIGH-SPEED DATA BUS CONNECTION AND FABRIC MANAGEMENT," and U.S. patent application Ser. No. 17/016,269 filed on Sep. 9, 2020 entitled "METHODS AND APPARATUS FOR IMPROVED POLLING EFFICIENCY IN NETWORK INTERFACE FABRICS", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data buses, interconnects and networking and specifically, in one or more exemplary embodiments, to methods and apparatus for providing interconnection and data routing within fabrics comprising multiple host devices.

2. Description of Related Technology

In many data network topologies, a fabric of network nodes (or switches or interfaces) enables interconnected nodes to transmit and receive data via, e.g., send/receive operations.

Message queues are sometimes used for communication between two nodes or endpoints. However, in very large architectures/fabrics, creating and connecting enough of these queues such that all endpoints can communicate would be impractical. This is especially true when queues are allocated to endpoints one a one-to-one basis. For instance, connecting all endpoints may require $n^2$ queues, where n is the number of endpoints. As queue (pairs) and connections would increase exponentially, this would consume a large amount of memory, require large computational costs, increase latency etc. Moreover, the receiver would be required to scan a large number of queues, many of which would not be used (or would be used rarely), causing inefficiencies.

Additionally, in some cases, only one user at a time can poll the queues, and it may be accomplished by linearly scanning all queues. This approach is not suitable for larger-scale fabrics with exponentially increasing queue pairs for increasing endpoints in modern and future implementations.

Moreover, extant send and receive operations generally require kernel involvement on both sides. In addition, send/receive operations for small payloads, especially for server-class processors (e.g., Xeon) may result in unacceptable levels of latency (5-7 microseconds versus a target range of 1-2 microseconds).

Hence, a solution that avoids the high latency while avoiding memory and computational burdens is needed. In particular, a fabric architecture that addresses the aforementioned deficiencies is needed, such as for use in server-class CPU and/or GPU acceleration use cases (e.g., accelerator cards).

SUMMARY

The present disclosure satisfies the foregoing needs by providing, inter alia, methods and apparatus for improved send/receive operations in networked fabrics.

In a first aspect of the disclosure, an architecture useful for message data processing within a computerized system is described. In one embodiment, the system includes a fabric comprised of a plurality of computerized nodes, and the architecture includes: at least one UMC (user message context) comprising at least one TX (transmit) queue and at least one RX (receive) queue; and at least one KMC (kernel message context) comprising at least one TX queue; wherein the at least one TX queue and at least one RX queue of each of the plurality of UMCs can be read from, and written to, directly from user space.

In one variant, the at least one TX queue of the KMC is configured to be written from a kernel associated with the at least one KMC such that access can be arbitrated between unrelated computerized processes.

In one implementation of the architecture, the plurality of computerized nodes comprise a PCIe (peripheral component interconnect express) compliant nodes in data communication with one another via the fabric; and each of the plurality of nodes comprises at least one of said UMC and at least one of said KMC.

In another variant, the at least one TX queue of the KMC comprises at least one first SRQ (static receive queue); the at least one RX queue of the UMC comprises at least one second SRQ (static receive queue); and the at least one first SRQ is in data communication with the at least one second SRQ such that the at least one first SRQ can transmit message data to be received by the at least one second SRQ.

In one implementation thereof, the at least one TX queue of the UMC comprises at least one dynamic queue pair (DQP), the at least one DQP configured to dynamically provide at least one of (i) said at least one TX (transmit) queue, or (ii) said at least one RX (receive) queue of said at least one UMC.

In another variant, the fabric architecture is configured for use in server-class CPU and/or GPU acceleration use cases (e.g., accelerator cards).

In a second aspect of the disclosure, a method of processing message data in a data processing system is disclosed. In one embodiment, the message data comprises a plurality of cells, and the method includes: determining at least one offset value associated with a queue for containing the message data; based at least on the determining, writing a plurality of message payload data into the queue; after completion of the writing of the plurality of message payload data, writing message header data; and after completion of the writing of the message header data, updating a pointer associated with a producing process of the message data.

In one variant, the determining at least one offset value comprises: determining first and second offset values; and based on the first and second offset values comprising respective first and second prescribed values, determining that the queue is empty.

In another variant, the writing of the message header data comprises updating a type field of the header data after all other writing of the message data header has been completed.

In a further variant, the writing of the plurality of message payload data comprises writing the payload data across a plurality of the cells located in the queue after (i) the header data, and (ii) metadata. In one implementation thereof, the updating a pointer associated with a producing process of the message data comprises moved the pointer to a boundary of a next cell disposed after the plurality of cells across which the payload data is written.

In another variant, the method further comprises performing, at a consuming node of the data processing system: identifying valid header data within a queue; based at least on the identifying, evaluating at least a portion of the header data; based at least on the evaluating, determining that a payload is present; based at least on the determining that a payload is present, copying at least a portion of the payload data into a user-specific receive buffer; and updating a pointer associated with the consuming node.

In one implementation thereof, the method further comprises propagating the update to the pointer associated with the consuming node a node comprising the producing process via a TX queue.

In another variant, the identifying valid header data comprises the consuming node polling at a value of the pointer associated with the consuming node and checking for a non-zero type value; and the copying at least a portion of the payload data into a user-specific receive buffer comprised copying the at least portion of the payload data according to a length specified in the header data.

In a further aspect of the disclosure, a method of message processing within a computerized data system configured to operate with a plurality of nodes is disclosed. In one embodiment, the method includes performing, at a first of said plurality of nodes: generating data specific to a send operation; queueing a first message in a first queue of the first node, the first message comprising data descriptive of a send buffer; sending a second message from the first node to a receiving second node, the second message configured to enable the receiving second node to perform a device-specific system call; receiving at the first node a third message, the third message comprising an address of a receive buffer of the receiving second node, and the data specific to the send operation; validating the third message based at least on the received data specific to the send operation; and based at least on the validating, causing performance of a DMA (direct memory access) operation using at least a kernel of the first node.

In one variant, the generating data specific to the send operation comprises generating a key; and the queueing a first message comprising data descriptive of a send buffer comprises queueing a message on a user-to-kernel queue comprising (i) at least one of send buffer address or length, and (ii) the generated key. In one implementation thereof, the device-specific system call comprises an ioctl operation; and the receiving at the first node a third message comprises receiving at the kernel of the first node the third message sent by a kernel of the second node.

In another variant, the causing performance of a DMA (direct memory access) operation using at least a kernel of the first node comprises: using the kernel of the first node to initiate the DMA operation from a source to a destination; using the kernel of the first node to receive a DMA completion notification; and using the kernel of the first node to write a DMA completion event on a kernel-to-user queue of the first node. In one implementation thereof, the method further includes the kernel of the first node transmitting a completion message to the kernel of the second node, the transmitted completion message configured to cause the kernel of the second node to write a completion event on kernel-to-user queue of the second node.

In another aspect, methods and apparatus for exchanging data in a networked fabric of nodes are disclosed. In one embodiment, the methods and apparatus avoid high latency associated with multiple kernel accesses, while also avoiding memory and computational burdens such as large memory and supporting processes needed to support large-scale fabrics.

In another aspect, methods and apparatus for handling messaging between a large number of endpoints without inefficiencies associated with scans of a large number of queues (including many of which would not be used or would be used rarely) are disclosed.

In another aspect, a computerized apparatus is disclosed. In one embodiment, the apparatus comprises memory having one or more NT BAR spaces associated therewith, at least one digital processor apparatus, and kernel and user spaces which each map to at least portions of the NT BAR space(s).

In another aspect, a networked node device is disclosed.

In another aspect, a data structure configured to enable transmission of data is disclosed. In one embodiment, the data structure comprises a scratchpad portion and message portion. In one variant, the message portion comprises a plurality of cells, each with at least (i) a header portion, and (ii) a payload or data portion. In some variants, the data structure further comprises a context portion, tag portion, and key portion as part of the header portion.

In another aspect, an integrated circuit (IC) device implementing one or more of the foregoing aspects is disclosed and described. In one embodiment, the IC device is embodied as SoC (system on chip) device which supports high speed data fabric operations such as those described above. In another embodiment, an ASIC (application specific IC) is used as the basis of at least portions of the device. In yet another embodiment, a chip set (i.e., multiple ICs used in coordinated fashion) is disclosed. In yet another embodiment, the device includes a multi-logic block FPGA device.

In an additional aspect of the disclosure, computer readable apparatus is described. In one embodiment, the apparatus includes a storage medium configured to store one or more computer programs, such as a message logic module of the above-mentioned network node or end user device. In another embodiment, the apparatus includes a program memory or HDD or SDD on a computerized network controller device.

These and other aspects shall become apparent when considered in light of the disclosure provided herein.

BRIEF DESCRIPTION OF THE DRAWINGS

FIG. 11 is logical flow diagram illustrating one exemplary embodiment of a method of implementing userspace-controlled messaging between a sender and receiver (and their respective kernels).

Figure 1:
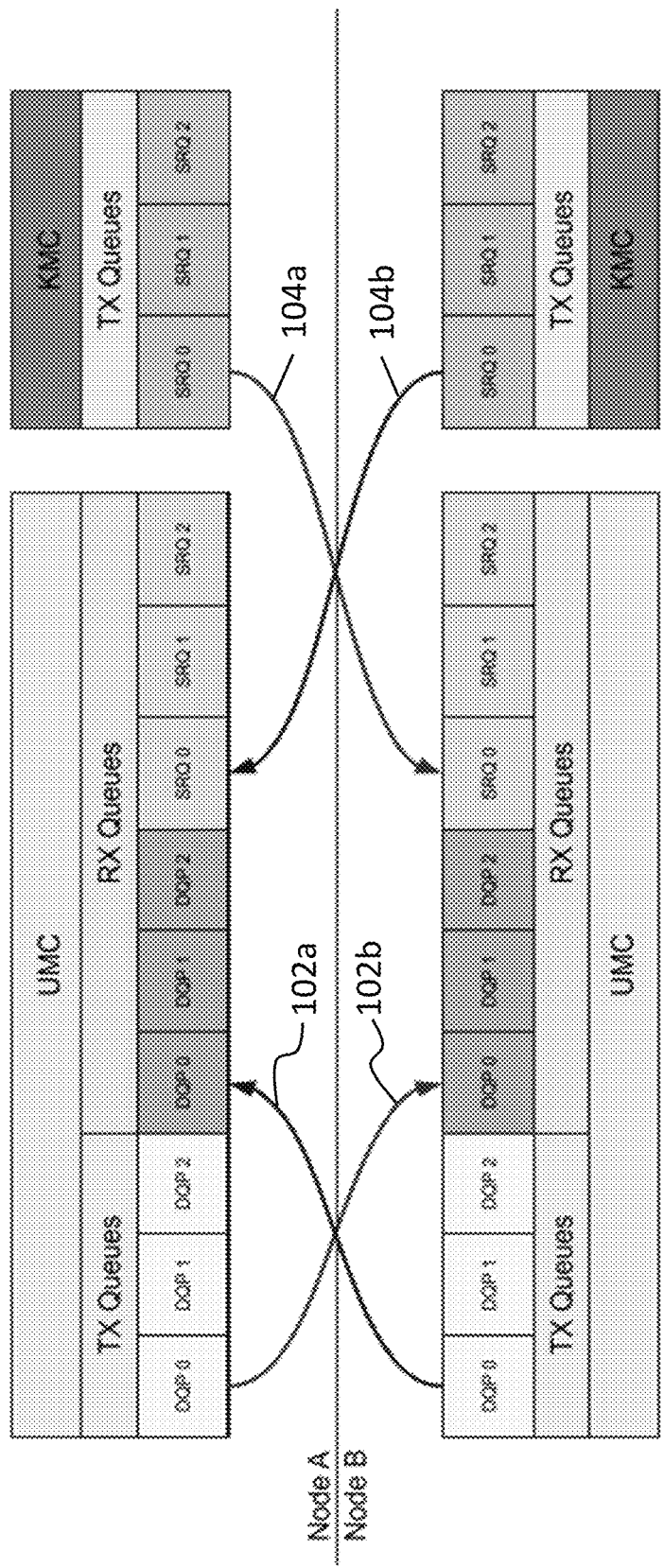
FIG. 1 is a graphical illustration of one embodiment of a user message context (UMC) and a kernel message context (KMC) performing send and receive operations.

All figures and tables disclosed herein are © Copyright 2019-2020 GigaIO Networks, Inc. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the terms "device" or "host device" include, but are not limited to, servers or server farms, set-top boxes (e.g., DSTBs), gateways, modems, personal computers (PCs), and minicomputers, whether desktop, laptop, or otherwise, as well as mobile devices such as handheld computers, PDAs, personal media devices (PMDs), tablets, "phablets", smartphones, vehicle infotainment systems or portions thereof, distributed computing systems, VR and AR systems, gaming systems, or any other computerized device.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, GPUs (graphics processing units), microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal or data interface with a component or network including, without limitation, those of the PCIe, FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), families.

As used herein, the term PCIe (Peripheral Component Interconnect Express) refers without limitation to the technology described in PCI-Express Base Specification, Version 1.0a (2003), Version 1.1 (Mar. 8, 2005), Version 2.0 (Dec. 20, 2006), Version 2.1 (Mar. 4, 2009), Version 3.0 (Oct. 23, 2014), Version 3.1 (Dec. 7, 2015), Version 4.0 (Oct. 5, 2017), and Version 5.0 (Jun. 5, 2018), each of the foregoing incorporated herein by reference in its entirety, and any subsequent versions thereof.

As used herein, the term "DQP" (dynamic queue pair) refers without limitation to a queue pair that is wired up on demand between two message contexts. Both RX and TX queues are accessed from user space.

As used herein, the term "eager send" refers without limitation to an operation wherein a sender sends header and payload data into a known receive area on a remote host, and the remote host copies the data from the receive area into its final destination.

As used herein, the term "garbage page" refers without limitation to a page used to accept writes to a DQP TX queue when a remote DQP has been unmapped, for the purpose of preventing a SIGBUS (bus error).

As used herein, the term "KMC" (kernel message context) refers without limitation to a set of TX queue accessed from the kernel, targeting remote SRQs. In some cases, there is only one KMC per node.

As used herein, the term "rendezvous send" refers without limitation to an operation wherein a sender and receiver first communicate headers (i.e., with no payload) only, such that the sender can transfer data directly into the final location on the receive side (thus avoiding any copying by the receiver).

As used herein, the term "SRQ" (static receive queue) refers to an RX queue (part a UMC) that receives messages from a remote KMC.

As used herein, the term "UMC" (user message context) is without limitation a set of RX and TX queues that an endpoint binds to in order to perform send/receive operations. UMC includes DQPs (RX and TX queues) and SRQs (RX queues only).

As used herein, the term "server" refers without limitation to any computerized component, system or entity regardless of form which is adapted to provide data, files, applications, content, or other services to one or more other devices or entities on a computer network.

As used herein, the term "storage" refers without limitation to computer hard drives, DVR device, memory, RAID devices or arrays, SSDs, optical media (e.g., CD-ROMs, Laserdiscs, Blu-Ray, etc.), or any other devices or media capable of storing content or other information.

Overview

In one salient aspect, the present disclosure provides mechanisms and protocols for enhanced inter-process (and inter-endpoint) communication, including within very large scale topologies involving e.g., hundreds or even thousands of nodes or endpoints, such as a large-scale high-performance compute or network fabric.

As referenced previously, extant designs may use queues (or pairs thereof) that connect at the node level (e.g., one queue pair for each node pair). These queues/pairs are managed entirely in the kernel. All users transmit by transitioning to the kernel and enqueuing messages on the queues/pair. Users must also transition to the kernel to read the queues/pairs. Use of polling in the foregoing process means that users must transition in and out of the kernel often; hence, the only way to know if there are messages to read on the queue pairs is to transition to the kernel. In some examples, only one user at a time can poll the queues, and it may be accomplished by linearly scanning all queues. This approach is not suitable for larger-scale fabrics with exponentially increasing queue pairs for increasing endpoints in modern and future implementations.

Hence, the improved methods and apparatus described herein address these issues by providing alternatives to such frequent kernel transitions (and the penalties associated therewith). In some embodiments, UMCs (user message contexts) are created, which contain TX and RX queues that can be read and written directly from user space. A KMC (kernel message context) is also used, in which TX queues are written from the kernel such that access can be arbitrated between unrelated processes.

Exemplary Embodiments

Exemplary embodiments of the apparatus and methods of the present disclosure are now described in detail. While these exemplary embodiments are described in the context of the previously mentioned PCI-based data network fabric with nodes and endpoints and UMC/KMC contexts, the general principles and advantages of the disclosure may be extended to other types of technologies, standards, networks and architectures that are configured to transact data and messages, the following therefore being merely exemplary in nature.

As a brief aside, the exemplary architecture and methods discussed herein may be configured to meet certain target performance aspects and design requirements.

Specifically, as alluded to above, small payload (e.g., 1-byte payload TLPs (Transaction Layer Packets) send/receive operations (e.g., "eager send") on CPUs should complete within a prescribed period; e.g., in under two (2) microseconds.

Moreover, the performance of larger payload send/receive operations ("rendezvous send") should not be affected negatively (to any significant level) by the exemplary architecture.

In addition, for some implementations, the total working set of the fabric should fit inside an expected BAR (Base Address Register) size while still leaving room for other regions, e.g., user RDMA (Remote Direct Memory Access) memory windows. Currently, on various extant systems, BARs are relatively large. Scalability is also a salient consideration; a given design should also be scalable and be usable with e.g., exponentially increasing queue pairs required in the fabric.

Lastly, memory protection should be provided and maintained. For instance, unprivileged users should not be allowed to potentially corrupt memory which does not belong to them or their application(s).

Based on the foregoing, exemplary implementations of various aspects of the improved architecture of the present disclosure are now shown and described with respect to FIGS. 1-11B.

Message Context Physical Memory Mapping—

FIG. 1 illustrates one exemplary architecture (developed by the Assignee hereof) involving use of a user message context (UMC) and a kernel message context (KMC) on two different nodes, with illustrative connectivities 102a, 102b and 104a, 104b shown between queues. In the context of the present disclosure, a user message context (UMC) can be thought of e.g., as a set of receive (RX) and transmission (TX) data packet queues that an endpoint (e.g., network node) binds to in order to perform send/receive operations. In exemplary embodiments, a UMC may include dynamic queue pairs (DQPs) (supplying RX and TX queues, as discussed below) and static receive queues (SRQs) (supplying RX queues only, as discussed below). In some cases, a UMC includes an array of dynamic queue pairs and static receive queues.

In one exemplary scenario, a dynamic queue pair (DQP) supplies user space-accessible transmission (TX) and receive (RX) queues. The transmission side of a DQP is wired to the receive side of another DQP on a remote node, and likewise in the other direction. See, for example, a DQP 102a and 102b. Since the both the transmit and receive queues are mapped into the user space process, no transition to the kernel is needed to read or write a DQP. In one approach, the dynamic queue pair is wired up on demand between two message contexts.

A static receive queue (SRQ) supplies a user space-accessible receive queue, but not a transmission queue. In one exemplary scenario, the transmission side is provided by a shared per-node kernel message context (KMC). In the exemplary embodiment, the user must transition to the kernel to make use of the KMC. See, for example, SRQ 104a and 104b in FIG. 1. Moreover, SRQs are statically mapped to the KMC from each node in the fabric (and likewise, the KMC is statically mapped to an SRQ in each UMC in the fabric). That is, the KMC can transmit a message to every UMC in the fabric.

Since DQPs are both read and written from user space, they provide the best performance (since, for example, send/receive operations may occur without incurring data transaction costs caused by, e.g., context switching into kernel space and/or requiring additional transaction times). However, creating and connecting enough DQPs such that all endpoints can communicate would be impractical. Initially, bindings from UMCs to endpoints are one-to-one. However, DQPs connecting all endpoints may require $n^2$ DQPs, where n is the number of endpoints. In some variants, n is equal to the number of logical cores per node, times the total node count. As queue pairs and connections would increase exponentially, this would consume a large amount of memory, require large computational costs, increase latency etc. Moreover, the receiver would be required to scan a large number of queues, many of which would not be used (or would be used rarely), causing inefficiencies.

One way to address these inefficiencies is to limit the number of DQPs per UMC, and complete the connectivity graph using SRQs. In many contexts, the number of SRQs per UMC may equal to the number of remote nodes (rather than the number of remote endpoints, as in a DQP), and therefore scales better. On the other hand, writing to an SRQ must be done through a KMC in the kernel, increasing the transmit latency as compared to send/receive operations performed via DQPs. Currently, send and receive operations require kernel involvement on both sides. In addition, send/receive operations for small payloads, especially for server-class processors (e.g., Xeon) may result in unacceptable levels of latency (5-7 microseconds versus a target range of 1-2 microseconds).

Hence, the improved methods and apparatus described herein address these issues by providing alternatives to such frequent kernel transitions (and the penalties associated therewith). In some embodiments, UMCs (user message contexts) are created, which contain TX and RX queues that can be read and written directly from user space. A KMC (kernel message context) is also used, in which TX queues are written from the kernel such that access can be arbitrated between unrelated processes.

Figure 2:
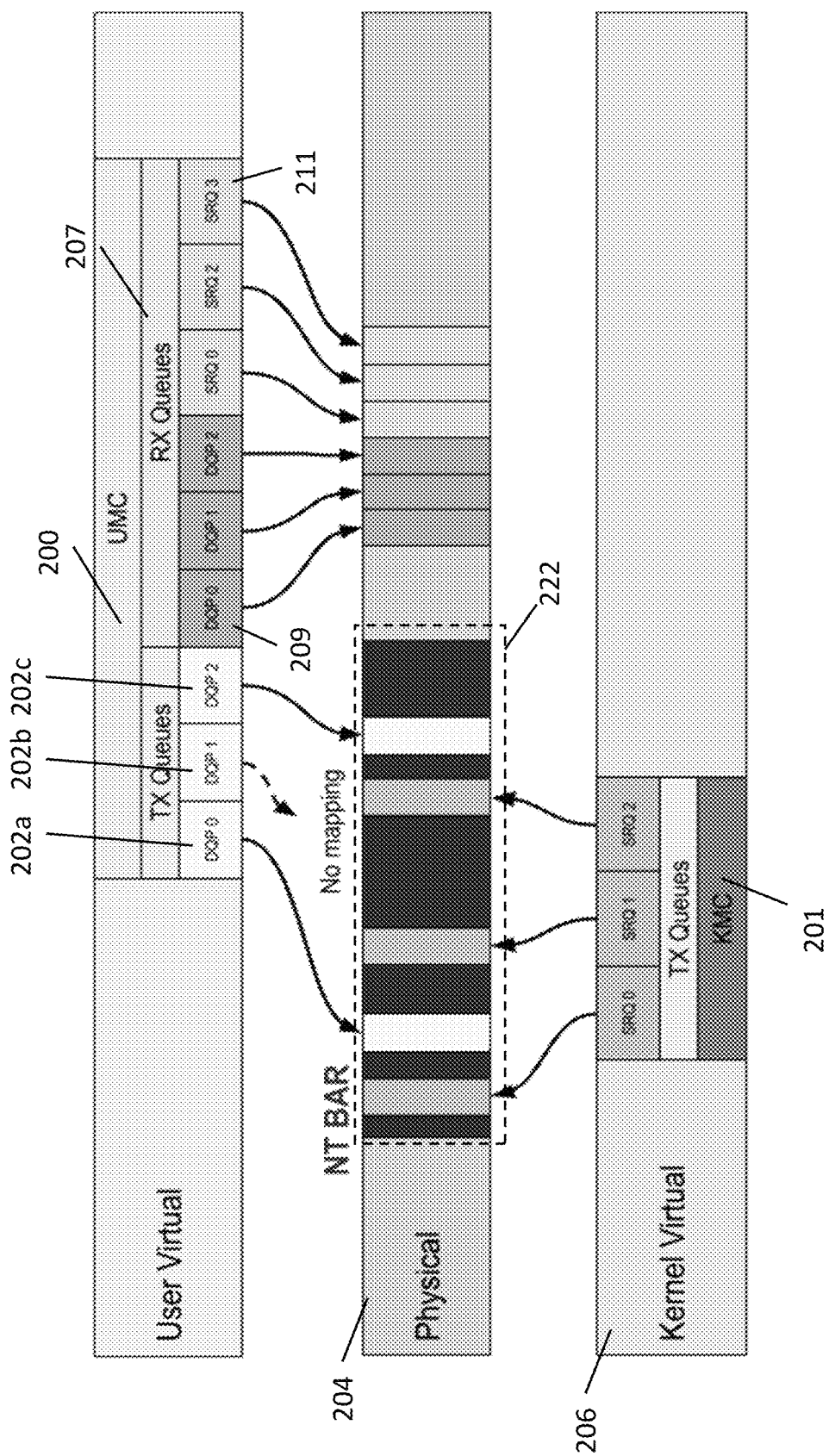
FIG. 2 is a diagram illustrating an exemplary relationship among a user message context (UMC), a kernel message context (KMC), and physical memory associated therewith, useful for describing the present disclosure.

FIG. 2 illustrates a diagram showing an exemplary relationship among a UMC 200, a KMC 201, and physical memory 204 associated with the user message context (UMC) and kernel message context (KMC).

In one embodiment, RX queues are backed by physical memory on the local node. As noted supra, the physical memory may be e.g., DRAM. In some variants, the physical memory may include memory buffers (including intermediary buffers). The backing physical memory need not be contiguous, but may be implemented as such if desired.

In the illustrated embodiment, the TX side of the dynamic queue pairs (DQPs) associated with the UMC 200 may map to queues on various different nodes. Note that not all slots need to be mapped if there has not yet been a need. For example, in FIG. 2, DQP 1 (202b) is not yet mapped, while DQP 0 (202a) and DQP 2 (202c) are mapped to a portion of the backing physical memory 204.

In the illustrated embodiment, the KMC 201 is statically mapped (i.e., mapped once at setup time). In various implementations, there may be a slot in the KMC 201 for every remote UMC 200 in the fabric, although other configurations may be used consistent with the disclosure.

Receive Queue Allocation—

Referring again to FIG. 2, the "RX Queues" portion of the UMC 200 in one exemplary embodiment is allocated and I/O mapped to the fabric by the kernel at module load time. A simple array of UMC RX queue structures 207 is allocated, whose length determines the maximum number of UMCs available in the system (an exemplary default length is given and explained below in "Message Context Sizing"). This in some scenarios allows for the assignment of queues at runtime to be simplified, since a userspace process can map all RX queues with a single invocation of mmap( ) vs. many such invocations. It may also be useful in future environments wherein memory management apparatus or logic (e.g., an input-output memory management unit (IOMMU)) is not enabled, since it would allow the kernel to allocate a large, physically contiguous chunk of memory, and simply report that chunk's base value and limit to peers (vs. needing to exchange an scatter gather list—i.e., a (potentially) long chain of memory addresses which are logically treated as a single chunk of memory—with peers).

In some variants, the region need not be physically contiguous, since it will be accessed through the MMU. This approach enables, inter alia, a more dynamic allocation scheme useful for larger clusters as a memory conservation measure.

Message Context Sizing (RX and TX Queues)—

Referring again to FIG. 2, in one exemplary embodiment, the size of each DQP region 209 may dictated by several parameters, such as e.g., (i) the number of DQPs 209 per UMC 200, and (ii) the size of each queue.

In the exemplary embodiment, each UMC will initially be bound to a single endpoint. An endpoint may be configured to support enough DQPs 209 such that its frequent communication partners are able to use a DQP (e.g., assigned on a first-come, first-served basis). In various implementations, this number may be smaller (to various degrees) than the total number of endpoints. For example, the literature such as "Adaptive Connection Management for Scalable MPI over InfiniBand" (https://ieeexplore.ieee.org/document/1639338), incorporated herein by reference in its entirety, suggests 2 log(n) as a reasonable number, as it supports common communication patterns. As an example, a cluster with 1024 nodes, each with 16 cores is shown by Eqn. (1):

$$2 \log(1024 \cdot 16) = 28 \qquad \text{Eqn. (1)}$$

It will be appreciated that more queues increases the cost of polling, since each queue must be polled. Additional considerations for polling are described subsequently herein in greater detail.

Figure 3:
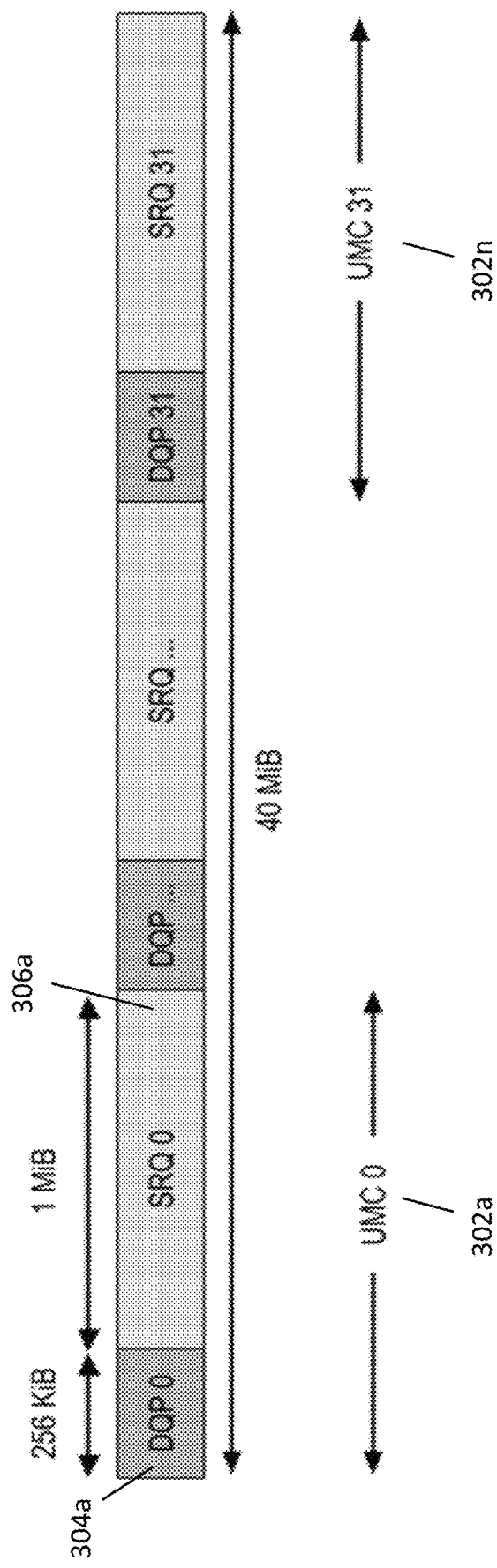
FIG. 3 is a diagram showing amounts of memory that may be allocated by each node according to one exemplary embodiment.

Referring now to FIG. 3, an exemplary allocation of memory to the DQPs 209 and SRQs 211 of FIG. 2 is illustrated. In one variant, this allocation will be exposed to the user process via a function such as mmap( ). Exemplary default values are 32 DQPs per UMC (e.g., UMC 0 (302a) or UMC 31 (302n) each having a DQP and SRQ) and 8 KiB per DQP. Therefore, each UMC may be allocated 256 KiB for DQPs (e.g., collectively DQP 0 (304a)). Moreover, the size of each SRQ region (e.g., SRQ 0 (306a)) is dictated by (i) the number of remote nodes and (ii) the size of each queue.

With respect to the number of remote nodes, there is generally an SRQ for all remote nodes from which this UMC may receive a message. With respect to the size of each queue, this may be exposed to the user process via the aforementioned mmap( ) function. In one implementation, each queue is 4 KiB aligned.

It will also be recognized that the cluster size may vary significantly. Loosely defined, "cluster size" in the present context can be defined as the number of different communicative nodes. In various embodiments, the initial default cluster size may be e.g., 256 nodes. Further, the default size for each SRQ may have the minimum of 4 KiB. Therefore, each UMC may devote 1 MiB to the SRQs.

Thus, given the above exemplary values, the total memory allocated and exported to the fabric by each node according to the defaults may be limited to (256 KiB+1 MiB)·32=40 MiB.

However, one with ordinary skill in the relevant art will appreciate that all the values mentioned above may be tunable, and/or dynamically assigned. In some embodiments, such parameters may be tuned or dynamically updated during runtime, or between send/receive operations. In some variants, only some of, e.g., the DQPs or SRQs, are updated between operations.

In one exemplary embodiment, a path may be provided by the KMC 201 (FIG. 2) to every remote UMC on the system (e.g., the fabric). As alluded to above, the initial default value (which again may be tuned to other values) may be set to support 256 nodes, each with 32 UMCs, with SRQs sized at 4 KiB. Therefore, the amount of memory the KMC 201 must map from the NT BAR 222 (see FIG. 2) may be represented per Eqn. (2):

$$4 \text{ KiB} \cdot 255 \cdot 32 = 31.875 \text{ MiB} \qquad \text{Eqn. (2)}$$

The considerations for UMCs 200 (FIG. 2) may be somewhat different than for KMCs. Since unused TX DQP slots in the UMC 200 do not map to memory, their cost is "free" in terms of imported fabric memory. However, if all DQP slots become occupied, the mapped memory must now be visible in the NT BAR 222 (non-transparent base address register). Following the example given above, each UMC may include 32 DQP slots at 8 KiB each, and each node may include 32 UMCs. Therefore, the maximum amount of memory all UMIs must map from the NT BAR 222 may be represented per Eqn. (3)

$$32 \cdot 32 \cdot 8 \text{ KiB} = 8 \text{ MiB} \qquad \text{Eqn. (3)}$$

Therefore, the maximum total amount of memory that must be reachable through the NT BAR may be approximately 40 MiB.

Base Address Exchange—

According to some implementations disclosed herein, the kernels of nodes that wish to communicate may need to know where to find the UMC regions for their DQP peer. In one exemplary embodiment, this is accomplished by "piggybacking" on the address exchange that already takes place between e.g., kernel module used to facilitate userspace fabric operations (such as the exemplary KLPP or Kernel Libfabric PCIe Provider module of the Assignee hereof) peers. For instance, this exchange may occur the first time a node's name is resolved for the purpose of exchanging numeric addresses.

Endpoint Binding—

As previously discussed, some exemplary embodiments of the fabric disclosed herein (e.g., in the context of the exemplary "libfabric" API) provide the concept of a "transmit context" and "receive context." That is, an endpoint must bind to one of each in order to send and receive messages. These contexts may be shared between endpoints (via, e.g., fi_stx_context or fi_srx_context signals), or be exclusive to one endpoint (via, e.g., fi_tx_context or fi_rx_context signals). It will be noted that the sharing mode of the transmit side and the receive side need not match. As an example, an endpoint may bind to a shared transmit context and an exclusive receive context.

Similarly, in exemplary embodiments, a UMC 200 may be bound to an endpoint, and offer a similar shared/exclusive model, in which a UMC may be bound to one or many endpoints.

However, the functionality of DQPs may require symmetric binding (as opposed to the aforementioned shared/exclusive binding). This is because part of the queue pair is used for syncing metadata between peers. As such, exemplary embodiments require exactly one RX queue and one TX queue on each side, an invariant that asymmetric binding breaks.

Initially, every endpoint may be bound to a single UMC, even if an exemplary fabric implementation requests shared contexts. Note that, since UMCs and endpoints may be bound one-to-one initially as noted above, this effectively limits the number of endpoints per node to the number of UMCs that have been allocated.

Dynamic Queue Pairs (DQPs)

DQP Assignment—

In exemplary embodiments of the disclosed architecture, all DQPs are initially unassigned. Although the TX and RX regions are mapped into the user process, the RX queues are empty (i.e., initialize with empty queues), and the TX queues have no backing pages (e.g., from backing memory 204 of FIG. 2).

Figure 4A:
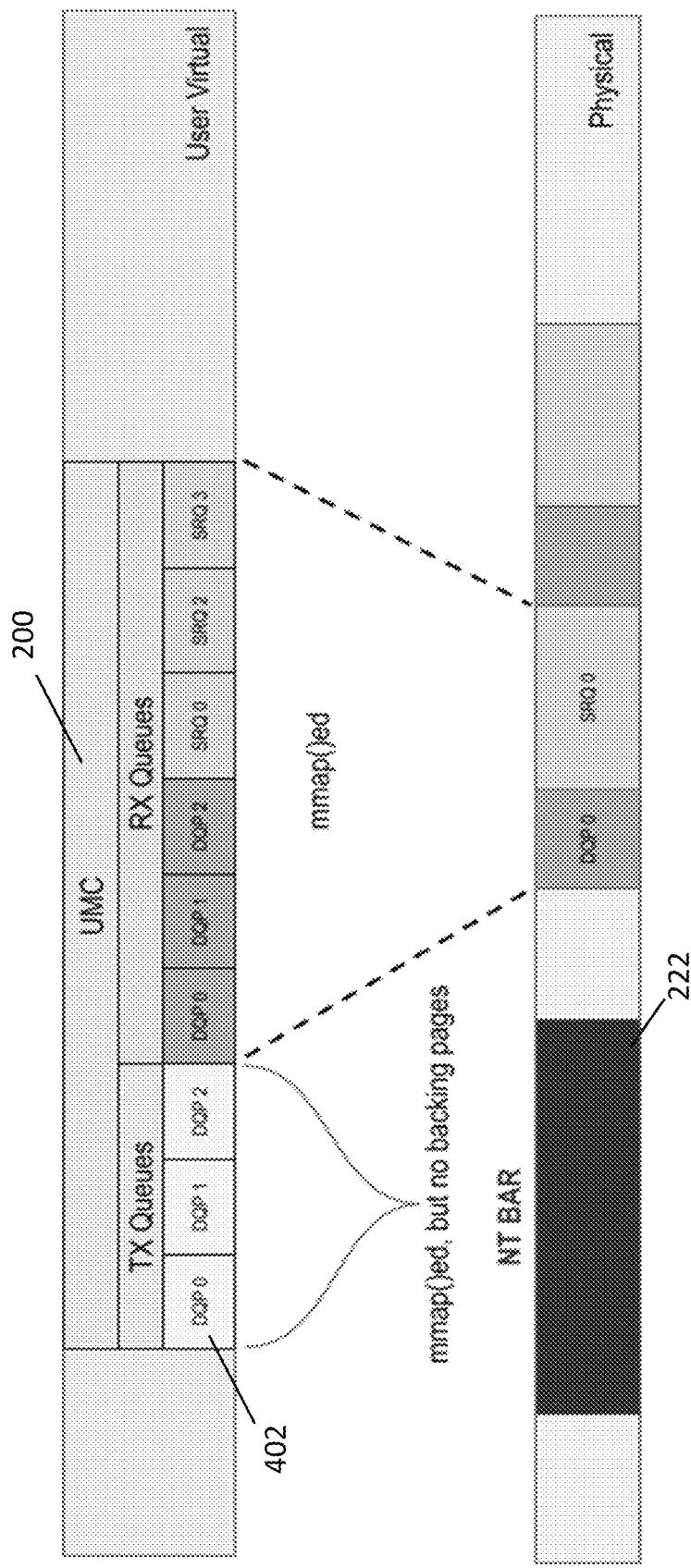
FIGS. 4A-4C are diagrams that illustrate an exemplary UMC structure with a DQP at an initial state, at a pending state, and at an in-use state.

FIG. 4A illustrates an exemplary UMC structure with 3 DQPs per UMC in their initial states. While the SRQ region is shown, the details are not shown.

In one exemplary embodiment, the mechanism for "wiring up" a DQP 207 includes a transmission of a signal or command by the kernel (e.g., kernel 206), such as a DQP_REQUEST command. The possible replies may include DQP_GRANTED and DQP_UNAVAIL.

A command such as DQP_REQUEST may be issued in certain scenarios. For example: (i) an endpoint sends a message to a remote endpoint for which its bound UMC does not have a DQP assigned (i.e., it must use the KMC to send this message); (ii) the endpoint's bound UMC has a free DQP slot; and (iii) the remote UMC has not returned a DQP_UNAVAIL within an UNAVAIL_TTL.

More specifically, when a UMC must refuse a DQP_REQUEST because it has no free DQP slots, it will return a TTL (time-to-live signal, e.g., a "cooldown" or backoff timer) to the sender reporting to indicate when the sender may try again. This is to prevent a flood of repeated DQP_REQUESTs which cannot be satisfied.

In the exemplary embodiment, the DQP_REQUEST is issued automatically by the kernel 206 when a user makes use of the KMC 201. The kernel will transmit the user's message via the KMC, and additionally send a DQP_REQUEST message to the remote system's kernel receive queue (such as an ntb_transport queue). In another embodiment, DQPs may be assigned only when explicitly requested (i.e., not automatically).

Figure 4B:
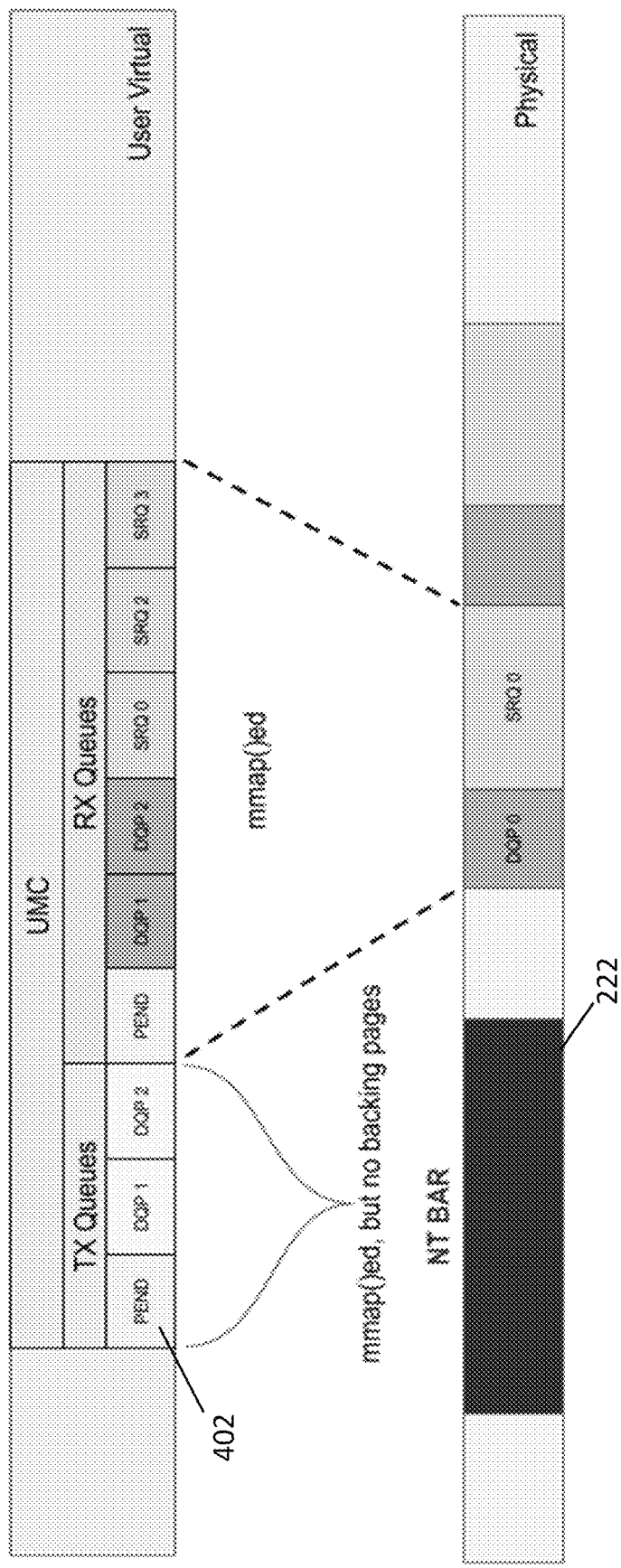

When the kernel sends a DQP_REQUEST command, it causes the next available slot in both the UMC to be marked as "pending" and reports that slot number in the DQP_REQUEST. As shown in FIGS. 4A and 4B, DQP 0 402 becomes marked as "pending". The slot remains in this state until a reply is received.

In some exemplary embodiments, a node that receives a DQP_REQUEST must check if the local UMC has an available slot. If so, the UMC assigns the slot and replies with DQP_GRANTED and the assigned slot index. If there is no slot, the UMC replies with DQP_UNAVAIL and UNAVAIL_TTL as discussed above.

Figure 4C:
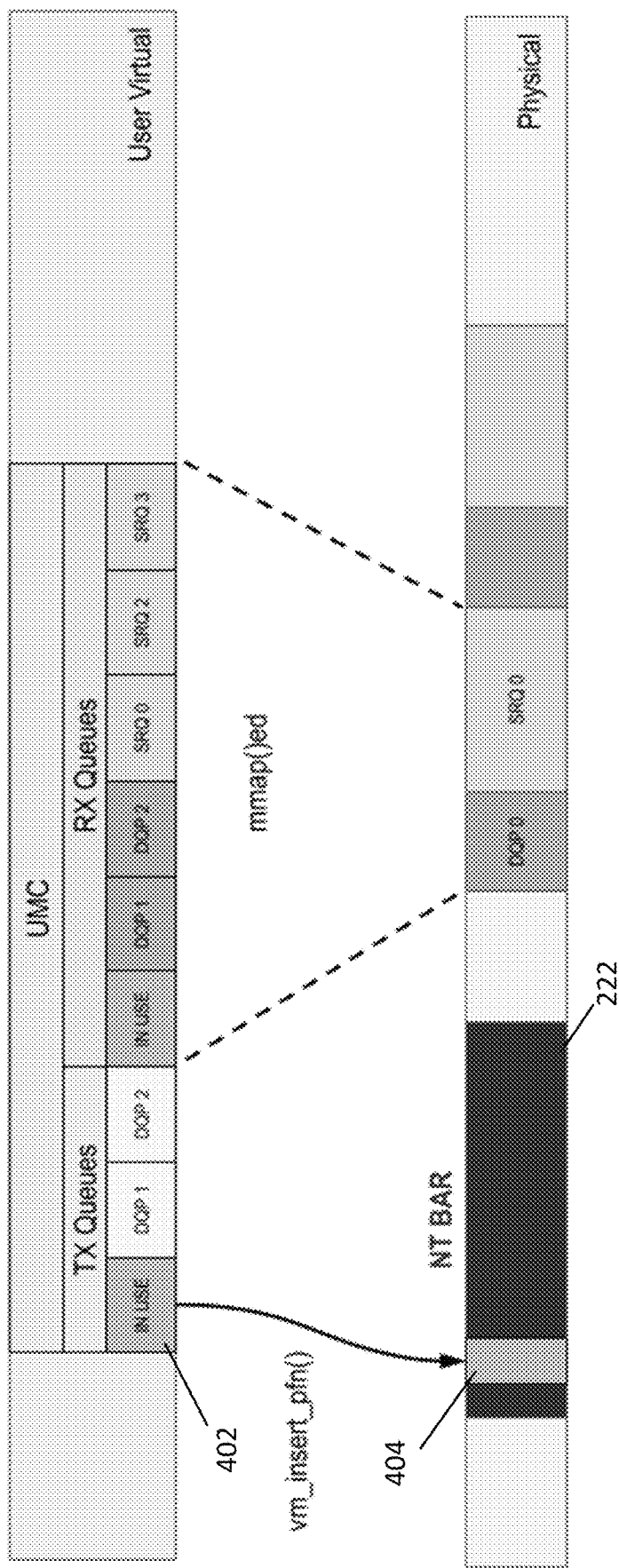

Both nodes may then map the TX side into the NT BAR 222, and mark the RX side as in use. As shown in FIG. 4C, DQP 0 (402) is now marked "IN USE" in the TX queue and the RX queue. A corresponding portion 404 of the NT BAR 222 may similarly be marked as in use.

In the exemplary embodiment, the users are informed of the new DQP mapping by an event provided via the kernel-to-user queue. The address of the newly mapped DQP is provided by the kernel, allowing the user to identify the source of messages in the RX queue. If the UMC 200 is shared by multiple endpoints, all associated addresses will be reported, with an index assigned to each. This index is used as a source identifier in messages.

DQP Structure—

In some embodiments, a DQP is laid out such that it minimizes the amount of traffic on the wire. Small size messages are often highly sensitive to overhead, so headers should be as concise as possible. Similarly, the TLP count should be minimized; for example, sending TLPs with e.g., 1 byte of payload is undesirable when larger TLPs could be sent.

Furthermore, the DQP is configured so as to prevent "false sharing" (i.e., two or more threads accessing independent parts of the same CPU cache line, which can cause expensive eviction of the cache line as each thread accesses it, even though their accesses do not actually conflict). Buffers may be aligned to at least 64 bytes (i.e., the size of cache lines in the exemplary x86 target architecture). However, it will be recognized that various different configurations are possible. For instance, in some variants, data buffers may be aligned to larger values (e.g., 128 or 256 bytes) to efficiently support streaming load/store instructions. In some implementations, such buffer size values may be dynamically adjusted for overhead efficiency (per above) depending on the application or need based on data movement.

The DQP may also be configured to minimize wasted space. As discussed in "*Investigations on InfiniBand: Efficient Network Buffer Utilization at Scale*" by Shipman et al. (http://citeseerx.ist.psu.edu/viewdoc/download?doi=10.1.1.89.3001&rep=rep1&type=pdf), incorporated herein by reference in its entirety, if receive buffers are of fixed size, and that size is chosen based on the largest desired message size, there will be poor buffer utilization (as smaller messages will have large overhead).

In exemplary embodiments of the present disclosure, the DQP is composed of 2 regions: (i) a 64-byte scratchpad region 504, and (ii) the message region 508 (see FIG. 5A). The scratchpad region is used for syncing queue metadata between peers, and the message region contains the messages themselves.

The message region is in one implementation composed of "cells" 509 which are 64-bytes each. See, e.g., the method used for intra-node communication in "*Implementation and Evaluation of Shared-Memory Communication and Synchronization Operations in MPICH2 using the Nemesis Communication Subsystem*" (https://www.mcs.anl.gov/uploads/cels/papers/P1346A.pdf), incorporated herein by reference in its entirety. The header portion of a message in one implementation begins on a cell. A single message (with header and data, e.g., payload) may consume many cells. In various implementations, the maximum "eager" message size may be a tunable parameter. In one specific implementation, the default value may be 1024 bytes.

Figure 5A:
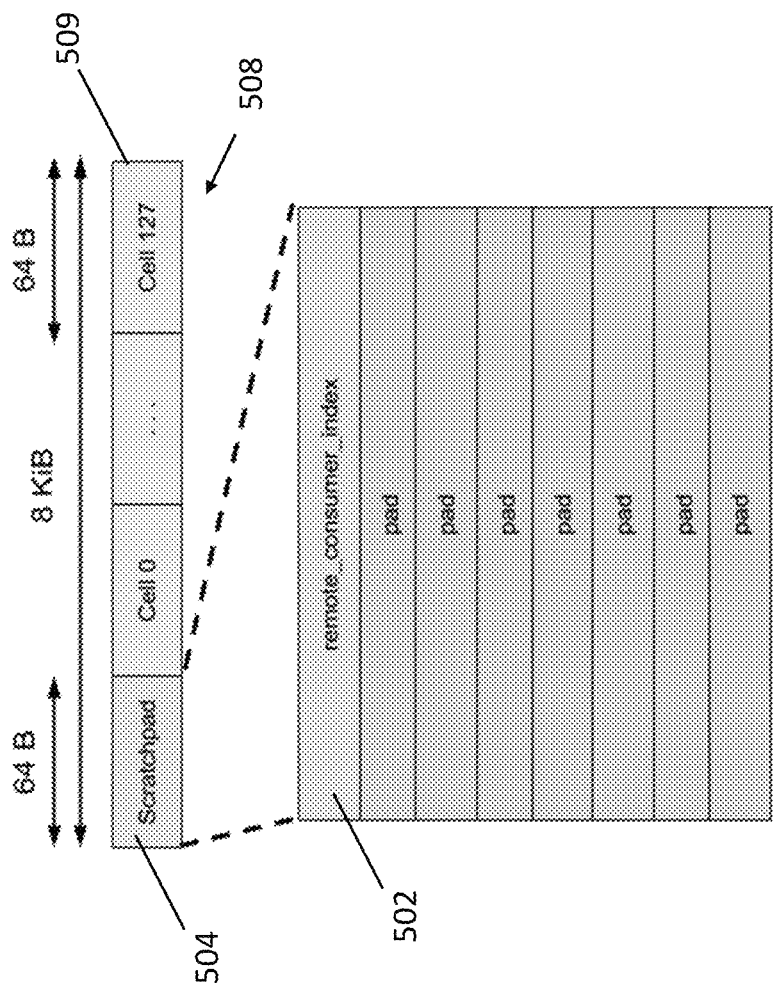
FIGS. 5A and 5B illustrate one embodiment of a layout of a queue and a cell therein according to the present disclosure.

In some embodiments, additional information is kept outside of shared memory. The layout of an exemplary single 8 KiB queue is shown in FIG. 5A. A producer index (e.g., TX queue) and consumer index (e.g., RX queue) (not shown) are maintained locally. The consumer index is also synced to the peer via a scratchpad region 504. The scratchpad region is used for syncing queue metadata between peers, and the message region 508 contains the messages themselves. The TX side may have visibility of both producer and consumer indexes, and compare these values to determine if the queue can accommodate a new message. The RX side, on the other hand, may examine the message header to determine if a message is present at the current index, and may not have visibility of the producer index.

Figure 5B:
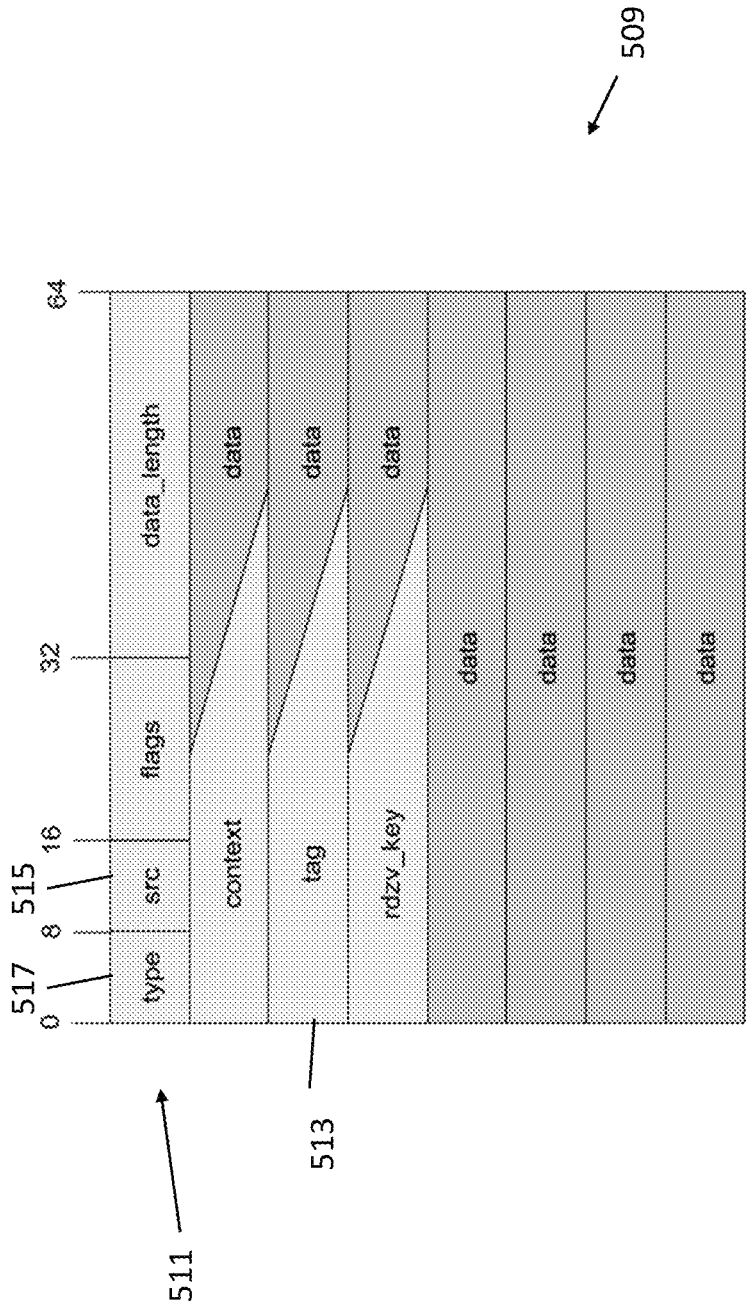

A diagram of a single cell 509 containing a message header 511 is shown in FIG. 5B. The first 64 bits of metadata are always present. Depending on the message type, there may be additional metadata afterward, or the data payload may begin. For example, a tagged message would include the tag 513 (optional metadata is shown with slanting lines in the diagram). If the UMC is exclusively bound (bound to a single endpoint), the "src" field 515 is ignored. Otherwise, it represents the source index of the bound endpoint (the full endpoint address is associated with an index at set up time.

The type field 517 is used to determine header validity. The producer sets this field as the final step in writing a message (or, more accurately, the type, src, flags, and data_length fields are updated together as a single 64 bit write), and the consumer clears this field after the message in the cell has been consumed.

Exemplary Eager Send Process—

Figure 6:
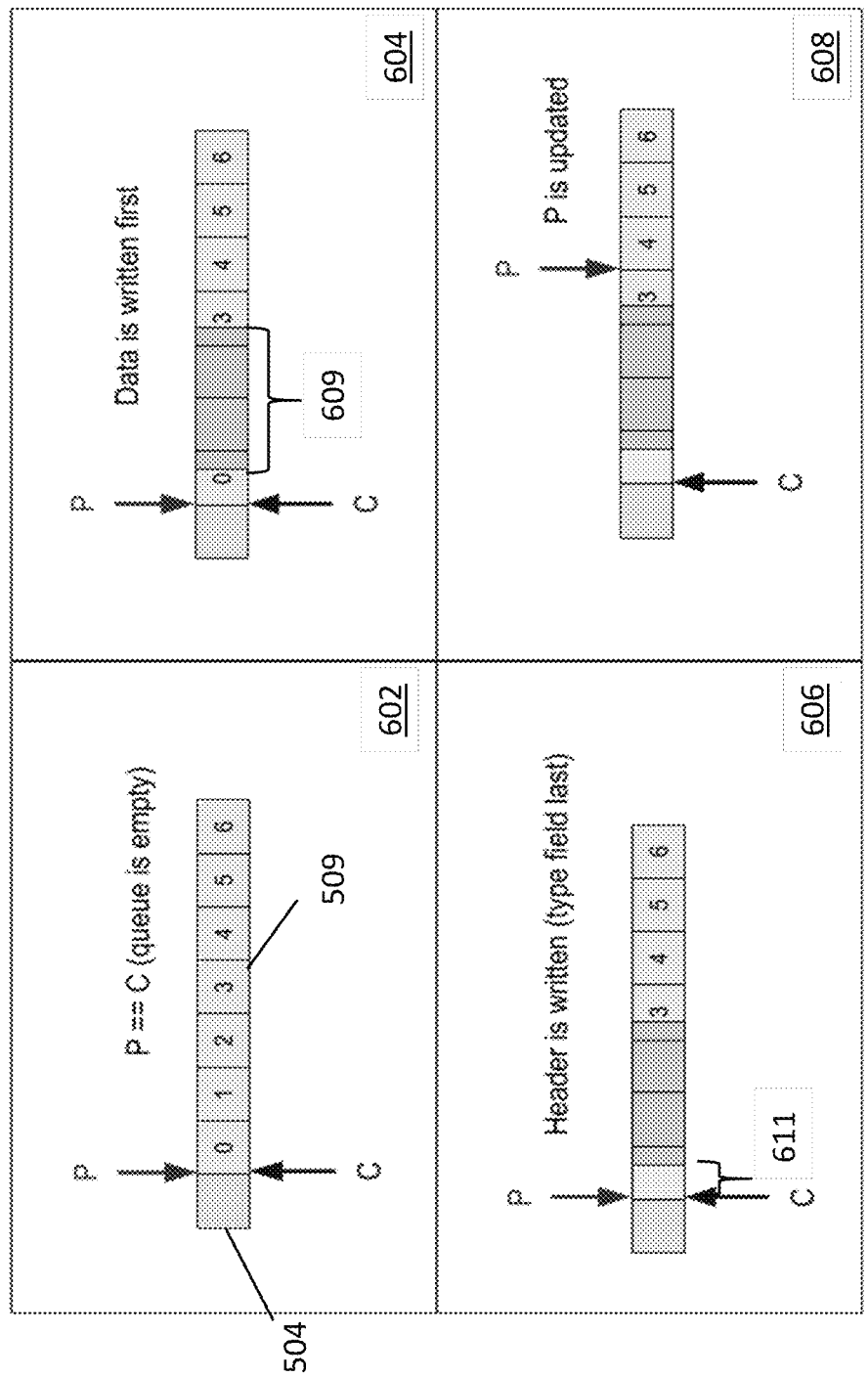
FIG. 6 is a diagram illustrating an exemplary process for writing data via an eager send according to the disclosure.

FIG. 6 graphically illustrates an exemplary embodiment of a producer (send-side) process for message handling in accordance with the disclosure. For this example, the DQP (queue) size is 512 bytes (1 scratchpad 504 and 7 cells 509), and is initially empty.

Per step 602, the producer (P) and consumer (C) offsets are first examined. They are equal (both 0), indicating an empty queue.

Per step 604, the data 609 is written. In this example, the user wants to send a tagged message of 176 bytes (tag and context metadata fields will be used). The first 40 bytes will accompany the header in cell 0, after the metadata. Cells 1 and 2 are filled completely, and the last 8 bytes are written into cell 3.

Per step 606, the header data 611 is written. In one embodiment, the consumer uses a valid header (specifically, a non-zero type value) to indicate a message is present. Hence, the header 611 is written after the data 609, and the type field is the last data updated.

Lastly, per step 608, the producer index P is updated. In the exemplary implementation, headers are made to always start on a cell boundary, so P is moved to the next cell boundary (i.e., at the beginning of cell 4).

Figure 7:
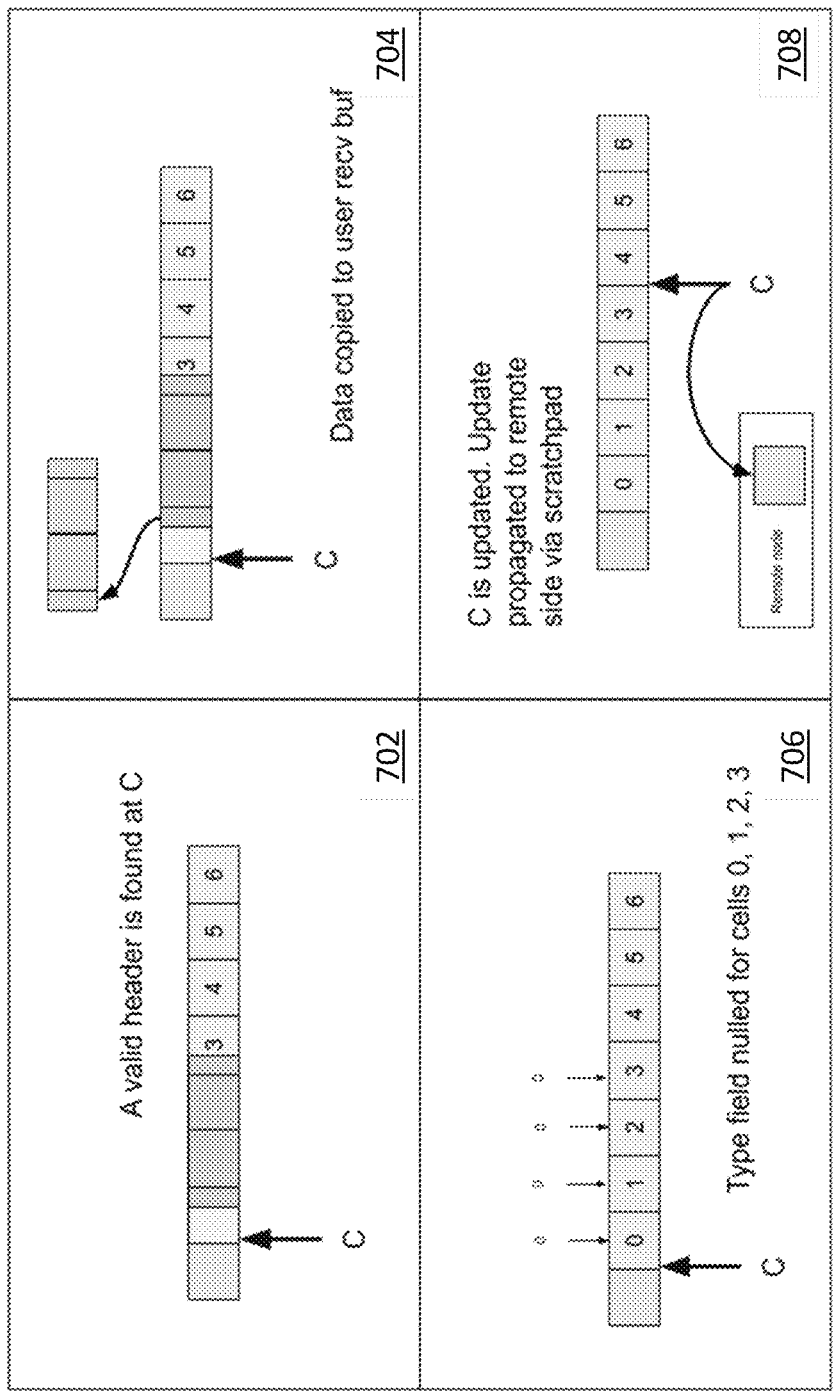
FIG. 7 is a diagram illustrating an exemplary process for receiving data via an eager receive.

Similar to FIG. 6, FIG. 7 graphically illustrates an exemplary embodiment of a consumer (receive-side) process for message handling in accordance with the disclosure. In the illustrated example, the queue state from the example of FIG. 6 is used as a starting point.

Per step 702, the consumer polls the cell at C, checking for a non-zero type value. When this is found, the header is examined. Here, the header type is "eager send", indicating a data payload is also present.

Per step 704, data is copied out of the queue into the user's receive buffer, according to the length specified in the message header.

Per step 706, each cell used for this message is in one embodiment treated like a header cell, and its type field zeroed. Since any cell may contain a header at some point, empty cells always have a zero type field.

Finally, per step 708, the consumer's index C is updated. This update is propagated to the remote node via the TX queue. It is noted that from a given endpoint's perspective, the remote consumer index for its TX queue can be found in its RX queue scratchpad. The propagation of C is performed once after all messages currently in the queue have been processed. As an optimization, these updates may also be delayed until more messages have been consumed, such as based on profiling to determine how often updates should be sent. Hence, the updates may also occur on an irregular periodicity or schedule in such implementations.

It is noted that in the exemplary implementation, producer and consumer indexes (P and C) are configured to increase monotonically. They never wrap—the user would need to write exabytes of data. To eliminate the need to split data payloads between the last cells and the first cells, a producer may consume the last cells in the buffer with a NOP message, and then copy the next message starting at cell 0. The receiver will discard the NOP message and advance the consumer index.

Static Receive Queues (SRQs)

Exemplary embodiments of the disclosed design are configured for a relatively small number of DQPs for each endpoint. However some jobs will need endpoints to communicate with far more peers than the DQPs allow. One solution to this issue is the SRQ, an asymmetrical queue pair in which the TX side is shared by all endpoints on the node (via the KMC 201) and the RX side is dedicated to an endpoint. In other words, an endpoint must have one SRQ 802 for each remote node that it might receive messages from (vs. one for each remote endpoint it receives messages from, as in a DQP). Since any endpoint on a node may enqueue messages to the same SRQ, the senders coordinate with each other to place their messages. In one implementation, the kernel is used to perform this coordination, which allows unrelated processes to safely share the KMC.

Figure 8:
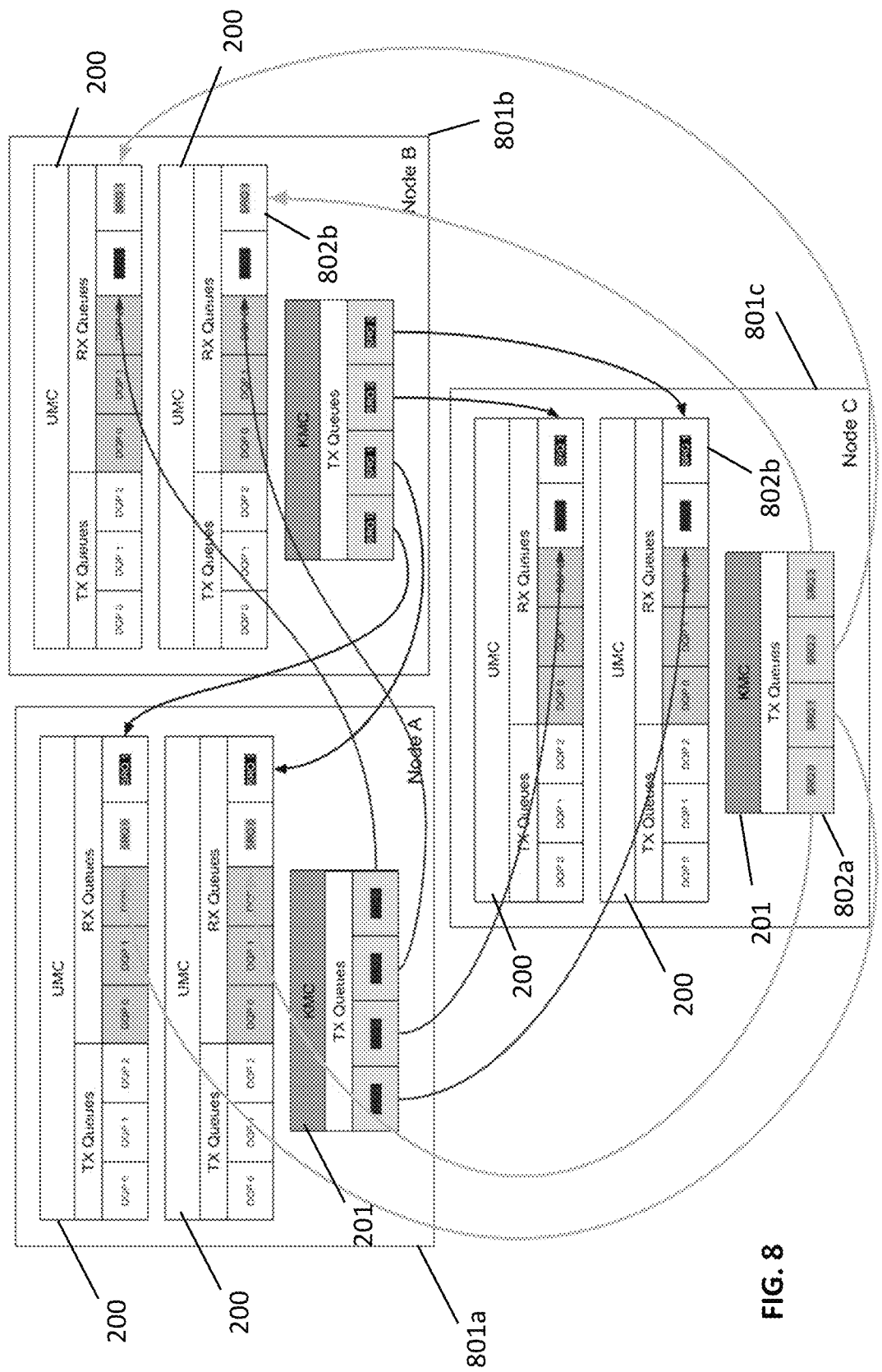
FIG. 8 is a diagram illustrating the connectivity of SRQs in an exemplary fabric with three nodes according to one embodiment of the disclosure.

FIG. 8 shows various permutations of the connectivity of SRQs 802 in an exemplary fabric with three (3) nodes (A, B, C) 801*a*, 801*b*, 801*c*, each with two (2) UMCs 200. The KMC 201 on each node can reach all UMCs 200 on all remote nodes.

The RX side 802*b* of the SRQ is assigned to an endpoint at creation time, and mmap( )ed into the user processes virtual address space. The TX side 802*a* is mapped in the kernel at initial IO address exchange time. Unlike DQPs, no additional mapping or coordination is needed at runtime beyond this setup.

SRQ Layout—

In one implementation, the SRQ 802 is configured to have the same layout as a DQP 202 (see FIGS. 5A and 5B described previously herein), with one important difference. In a DQP, the scratchpad 504 contains a remote_consumer_index, which is written by the remote node as it consumes messages. However, an SRQ is not a symmetrical queue pair. Therefore, there is nowhere for the SRQ to propagate consumer index updates. For this reason, the RX side scratchpad contains the local consumer index. Senders keep a copy of the remote consumer index locally, and use a PIO read operation to refresh its value from the remote side. This is further explained below.

Figure 9:
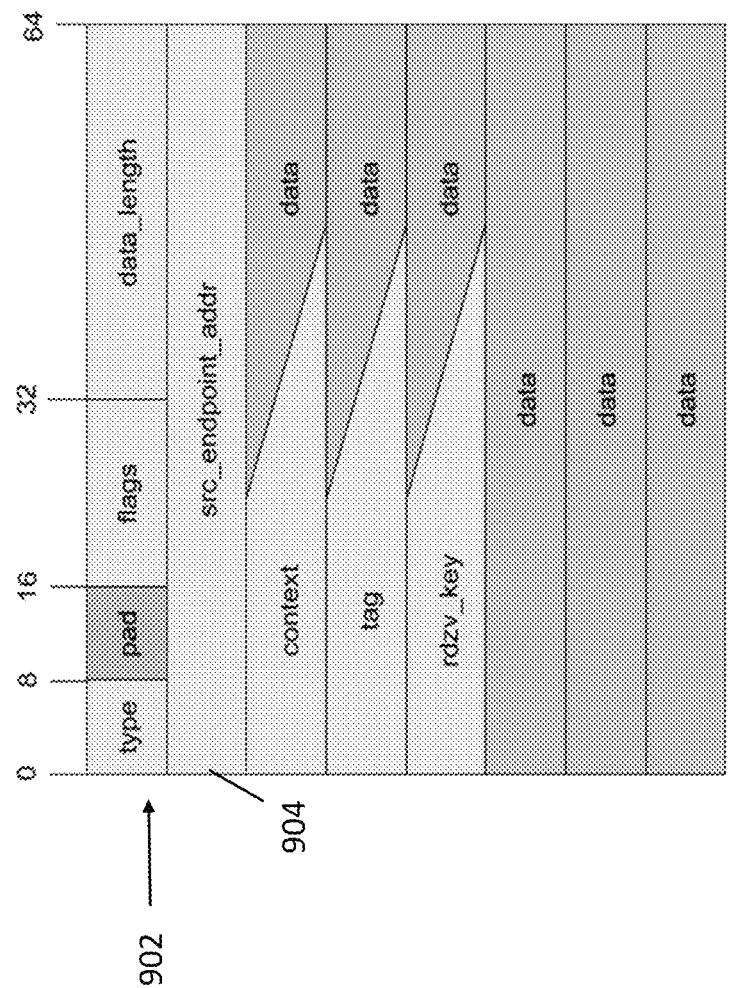
FIG. 9 is a diagram illustrating the layout of an exemplary embodiment of an SRQ header.

FIG. 9 shows one embodiment of an SRQ cell layout according to the disclosure. The SRQ header 902 is nearly identical to the DQP header previously described, with one difference: a complete source endpoint address 904 is needed. This is because the SRQ may receive messages from any endpoint on a given remote node. That is, because DQPs have a wire-up stage, a mapping from index to full endpoint address can be set up at this wire-up stage. Thus, the src identifier can be compressed into the 8-bit "src" field. Conversely, SRQs do not have this wire-up stage. It is unknown who the sender might be, so there is no opportunity to build a lookup table that allows compression of the src address.

SRQ Producer/Consumer Process—

In one embodiment, the producer/consumer processes used for SRQs 802 are configured to be nearly identical to that used for DQPs 202 (see discussion FIGS. 6 and 7 supra), with the following differences:

1. The consumer does not propagate its consumer index (C) to the remote side after reading messages. As discussed above, there is no companion queue on the remote side to accept this information.
2. If the producer finds the queue full, it will use a PIO (programmed input/output) read operation of the remote scratchpad region to update its copy of the remote consumer index. In one implementation, the rate at which this update can be performed is throttled with exponential or other backoff to avoid flooding the fabric with reads. That is, each time the remote consumer index is read and the queue remains full, the time to the next read is multiplied by 2 (another multiplier may be chosen based on later profiling). It will be appreciated, however, that other backoff algorithms may be utilized consistent with the disclosure, such as those based on random number generation, non-exponential (e.g., linear) backoff, etc.

Behavior on Full TX Queue

As previously described, there are various transmit queues used within the disclosed architecture (DRQs 202, SRQs 802, ntb_transport queues). Sometimes these queues will be full when the user wants to transmit a message. In some cases, such as when the user is initiating a new transaction, an EAGAIN (in this instance indicating that a send cannot take place due to, e.g., lack of internal buffer space to accommodate it) can be returned to the user. In other cases, the message is part of an ongoing transaction (e.g., it is a kernel-to-kernel message for a rendezvous send). In such a case, dropping the message would strand the transaction. While different approaches may be utilized, the simplest solution is to "spin" on the TX queue, waiting for space to become available, eventually failing the transaction after a timeout. This is the method chosen for use in the exemplary embodiment of the disclosed architecture, as it is simple to implement. It may not, however, provide the best performance, as discussed in greater detail subsequently herein.

Endpoint Addressing

Figure 10:
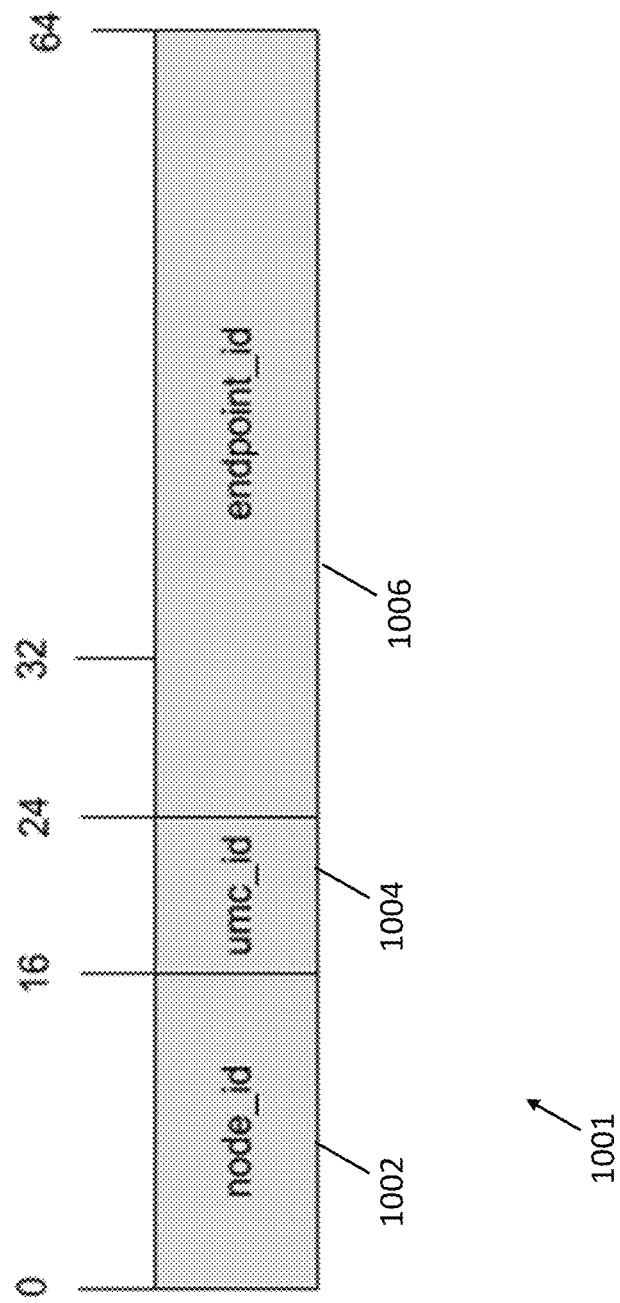
FIG. 10 is a diagram of an exemplary embodiment of an endpoint address.

FIG. 10 shows an endpoint address (fi_addr_t) 1001 including a 16-bit node component 1002 and a 48-bit endpoint component. In the disclosed scheme, an endpoint receives messages in a UMC 200, which may be shared among endpoints. Senders need to know the UMC number in order to identify which receive queue to place messages in. Therefore, the fi_addr_t 1001 needs to identify both the UMC (via the umc_id 1004) and the endpoint (via the endpoint_id 1006). To accomplish this, 8 bits are taken or "repurposed" from the extant endpoint_id (leaving 40 bits for the endpoint_id), and given to the new field umc_id.

Progress Polling

In one configuration of the architecture, an endpoint polls all active DQPs sequentially. Initial testing by the Assignee hereof has shown that for the exemplary DQP count previously described (i.e., 32 per endpoint), a simple linear poll of all DQPs performs well, with negligible overhead.

SRQs, on the other hand, could theoretically number in the thousands. However, clusters will in some applications be small. Therefore, in such small-cluster cases, a linear polling approach is used. Note that, since the KLPP must perform an address exchange with any node it will communicate with, it is known how many SRQs are active. Therefore, even if thousands of them are allocated, if only a few are used, linear polling will be sufficiently fast, as only the active SRQs need to be polled.

However, quickly finding DQPs or SRQs that have new data to process, given that there may be thousands of such queues (most of them empty), presents a significant challenge. In one exemplary implementation of the architecture disclosed herein, one or more of (i) polling groups, or (ii) queue-ready flag mechanisms, are utilized to enhance polling efficiency in such large-scale applications. Details on the foregoing exemplary techniques are presented in co-owned U.S. patent application Ser. No. 17/016,269 entitled "METHODS AND APPARATUS FOR IMPROVED POLLING EFFICIENCY IN NETWORK INTERFACE FABRICS" and filed contemporaneously herewith on Sep. 9, 2020, which is incorporated herein by reference in its entirety, although it will be appreciated that the present disclosure is not in any way limited to use of such techniques.

Rendezvous Send/Receive (DMA)

Since "eager send" operations can be accomplished via DQPs entirely in userspace, and send operations of any size must maintain ordering (between endpoints), it follows that rendezvous send/receive operations must also be controlled from userspace. This presents some complications, as the user generally must be able to initiate DMA requests safely. In the kernel-controlled model, the kernel can validate send DMA requests easily, since it has complete context of the request. Moving control to the user means that the kernel must now somehow verify that the DMA request corresponds to a valid send/recv.

FIG. 11 is logical flow diagram illustrating one exemplary embodiment of a method 1100 of implementing userspace-controlled messaging between a sender and receiver (and their respective kernels).

As shown, the sender first generates data e.g., a key specific to the contemplated send operation per step 1102.

Next, per step 1104, the sender (process) places a message in a user-to-kernel queue that includes data describing one or more attributes of the send buffer.

Per step 1106, the sender sends a message of a prescribed type (e.g., RDVZ_SEND) to a receiver, including the generated data/key.

Per step 1108, the receiver receives the sent message of step 1106, and transfers the relevant message information to a receive buffer.

Per step 1110, the receiver (e.g., kernel) sends a message to the sender (kernel), which includes data regarding the receive buffer, as well as the generated data/key.

Per step 1112, the sender validates the received generated data/key, and identifies the associated send buffer in the process.

Per step 1114, the sender's kernel then performs the desired kernel operation (e.g., a memory access such as a DMA operation). When completed, the sender's kernel receives a completion notice, and the sender's kernel writes a completion event into a sender kernel-to-user queue, and indicates completion of the operation to the receiver's kernel per step 1116.

Figure 11A:
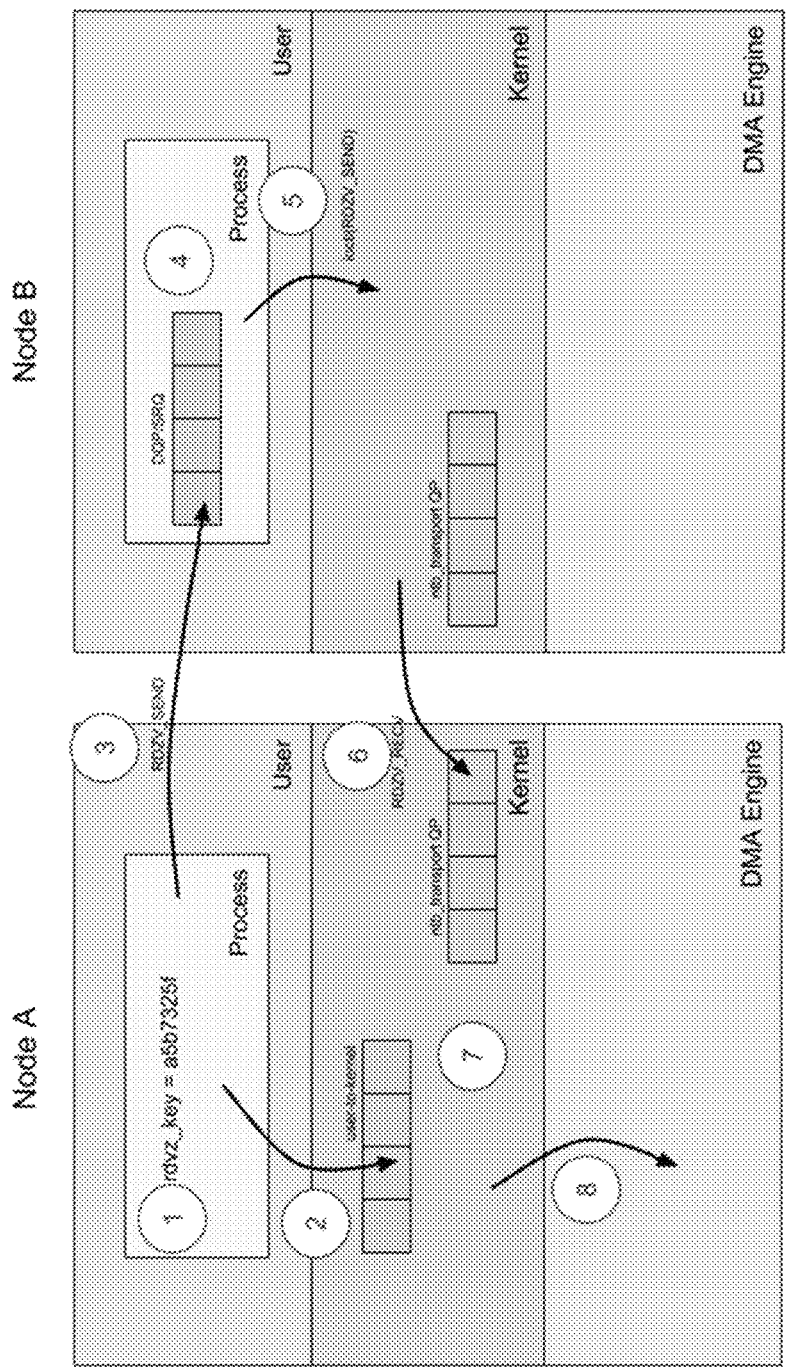
FIGS. 11A and 11B is a graphical representation illustrating an exemplary implementation of the methodology of FIG. 11, wherein a process for data transmission via a rendezvous send is described.
Figure 11B:
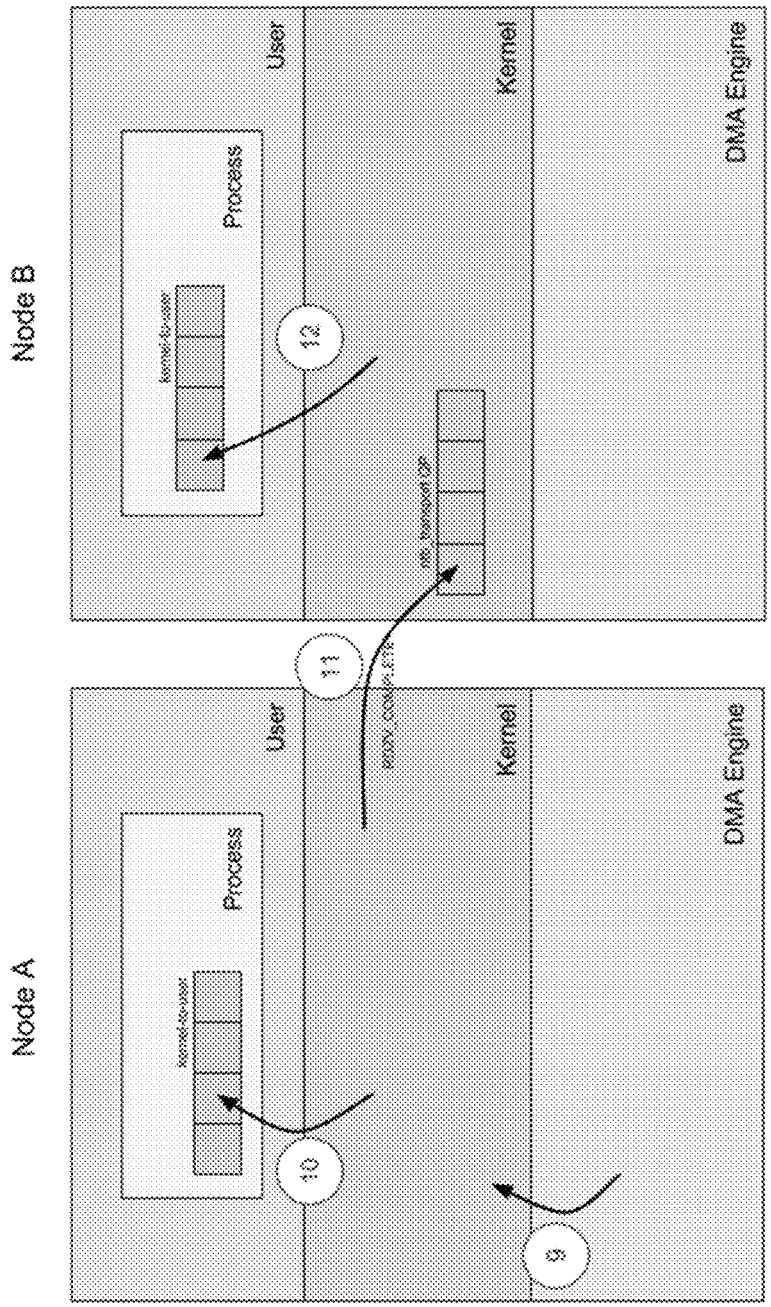

FIGS. 11A and 11B illustrate one particular implementation of the generalized methodology 1100 of FIG. 11, demonstrating how transaction of certain types of messages (here, "rendezvous" sends) is accomplished. Prototyping by the Assignee hereof shows that this method has performance at least commensurate with existing methods (i.e., those controlled from the kernel). The paragraph numbers listed below (1.-12.) correspond to similar numbering on FIGS. 11A-11B.

1. Sender generates a rendezvous key (rdzv_key) specific to this send operation.
2. Sender enqueues a first message on the user-to-kernel queue that describes the send buffer (address, length, rdzv_key). No transition to the kernel is needed.
3. Sender sends a RDZV_SEND message to the receiver; this includes the same information as an "eager send," plus the generated rdzv_key.
4. Receiver accepts the send (after matching tag, etc.).
5. Receiver performs RDZV_RECV ioctl (i.e., a device-specific input/output control call) with transfer information (receive buffer addr/length, sender endpoint ID, rdzv_key). If an MR for the receive buffer does not yet exist, it will be generated here (pages pinned and IO mapped).
6. Receiver's kernel sends a RDZV_RECV message to sender's kernel. This message includes the IO address of the receive buffer as well as the rdzv_key.
7. Sender validates the rdzv_key, looking up the send buffer in the process. If an MR for the send buffer does not yet exist, it will be generated here.
8. Sender's kernel kicks off a DMA from src to dst.
9. Sender's kernel receives DMA completion.
10. Sender's kernel writes DMA complete event on kernel-to-user queue.
11. Sender's kernel sends RDZV_COMPLETE to receiver's kernel.
12. Receiver's kernel writes completion event on kernel-to-user queue.

User/Kernel Asynchronous Communication

In some designs, a userspace component which interacts with the previously described KLPP to provide userspace messaging/RMA services (such as the LPP or Libfabric PCIe Provider solution of the Assignee hereof) utilizes message queues for communicating between the kernel and userspace. Exemplary implementations of the present disclosure make use only of a kernel-to-user queue in the form of a libfabric completion queue. In the present context, the term "libfabric" refers without limitation to a core library component of OFI (Open Fabrics Interfaces) that defines and exports the user-space API of OFI, and is typically the only software that applications deal with directly. Throughout this design, a "kernel-to-user" and "user-to-kernel" queue are referenced. In one approach, this functionality is implemented as a new queue pair between each user and the kernel, which replaces the existing completion queue.

However, in some cases, a generic message queue may be used to enhance functionality. The reason for this approach is twofold: (i) as more information needs to be passed between kernel and user asynchronously (i.e., in addition to libfabric completions), the utilization of the new queue-pair approach may become limiting/cumbersome; and (ii) pushing libfabric knowledge out of the kernel and into userspace increases flexibility of a given design. For example, an accelerator card is likely to support generic operations (e.g., DMA completions, or perhaps even send completions) and lack libfabric-specific knowledge. Therefore, it will be easier to replace kernel code with hardware if the interface is more generic.

Examples of user-to-kernel messages that may take advantage of this functionality include: (i) rendezvous send request messages, and (ii) DQP unmap ACK messages. Examples of kernel-to-user messages include: (i) DQP mapped messages; (ii) DQP unmapped messages, and (iii) DMA complete messages.

Kernel-To-User Queue Overflow—

If the user finds its TX queue full, it can, in general, fail the current operation such as via use of EAGAIN. However, the kernel may not have such a luxury, and certain messages cannot simply be discarded. Therefore, in one embodiment, the kernel is configured to allocate additional space for overflow messages, such as up to a tunable limit. If the user reaches the overflow limit, it is considered fatal, and the user's handle to the domain is revoked, and all associated fabric resources released.

Servicing the Kernel

In some embodiments of the design disclosed herein, a user thread's poll loop normally occurs entirely in userspace (without involving the kernel). However, for some operations (e.g., rendezvous send), the thread needs to transition to the kernel to make further progress. Making such transitions speculatively (i.e., without knowing if there is work to do) can detract from performance. Hence, in some variants, the LPP code is used to throttle kernel transitions in order to limit the performance impact to OS bypass operations. However, even with such throttling, the impact still exists.

Accordingly, in another embodiment, transitions to the kernel are permitted only when it is known to be necessary. This implies that the user has some means of determining work is available in the kernel. One method to accomplish this functionality is a page of "kernel service" flags. The page contains an array of e.g., 8-byte flags, each corresponding to a local endpoint. The flags are normally set to zero. All endpoints map this page as "read only," and poll the flag corresponding to their endpoint ID (e.g. periodically, on an event driven basis, or other). If the flag transitions (e.g. to "1"), the endpoint transitions to the kernel to make progress, and then resets the flag to "0."

In one implementation, the kernel service flags described above are set by a remote node, such as whenever they transmit a command to the remote peer. All remote nodes transmitting to the same remote endpoint set the same flag.

Assuming e.g., a 256 node cluster, each node must map a page from 255 peers. This consumes approximately 1 MiB of IO mapped memory.

Statistics Counters

In some kernel-controlled models, domain-wide statistics (such as number of commands sent) can easily be tracked, since all such communications are funneled through a single point. In a hybrid user-controlled/kernel-controlled model, determination of such statistics is not as simple as under a purely kernel-controlled model.

Hence, in one exemplary embodiment, a "stats page" is used which is mapped to each user process. The process increments various counters (e.g., messages sent) from userspace. If aggregate, domain-wide statistics are requested, the kernel sums statistics from all users to generate overall statistics. This operation may have significant latency; however, it is expected to be used rarely and as such the latency is acceptable. Additionally, the final values in the statistics page may be added to the running totals, such as periodically, under low activity/overhead conditions, or when the user exits.

Prototype Performance Results

Table 1 below shows the performance of an exemplary prototype version of the DRQ mechanism, as implemented on i7 Kaby Lake to demonstrate enhancements provided by various aspects of the disclosure. For this test, 1024 bytes is the maximum "eager send" size, although clearly other values may be used.

TABLE 1

OSU MPI Latency Test v5.6.1

| # Size | Latency (μs) |
|---|---|
| 0 | 1.34 |
| 1 | 1.20 |
| 2 | 1.20 |
| 4 | 1.21 |
| 8 | 1.20 |
| 16 | 1.20 |
| 32 | 1.35 |
| 64 | 1.51 |
| 128 | 1.73 |
| 256 | 2.30 |
| 512 | 2.95 |
| 1024 | 4.65 |
| 2048 | 19.33 |
| 4096 | 19.27 |
| 8192 | 19.27 |
| 16384 | 22.54 |
| 32768 | 27.42 |
| 65536 | 35.86 |
| 131072 | 55.68 |
| 262144 | 90.30 |
| 524288 | 171.00 |
| 1048576 | 316.34 |
| 2097152 | 605.61 |
| 4194304 | 1179.80 |

Table 2 below illustrates results from an exemplary prototype of the SRQ mechanism (in which transmitters must go through the kernel). As indicated by the data, latency performance falls off faster as a function of size than as occurs in Table 1; as such, the rendezvous send threshold value may need to be reduced for SRQ transfers in some scenarios in order to maintain adequate performance.

TABLE 2

OSU MPI Latency Test v5.6.1

| # Size | Latency (μs) |
|---|---|
| 0 | 1.73 |
| 1 | 1.77 |
| 2 | 1.81 |
| 4 | 1.97 |
| 8 | 1.79 |
| 16 | 1.82 |
| 32 | 1.97 |
| 64 | 4.94 |
| 128 | 8.25 |
| 256 | 14.72 |
| 512 | 27.44 |
| 1024 | 52.96 |

Alternative Implementations

It will be appreciated that there are a wide range of possible alternatives and substitutions that may be utilized consistent with the disclosed architecture, depending on individual applications and desired performance attributes. The following discussions provide examples of some such alternative for purposes of illustration. These examples are in no way intended to be limiting on the disclosure, and other approaches will be recognized by those of ordinary skill given the present disclosure.

Connected Endpoint Semantics—

Some exemplary embodiments of the design disclosed herein utilize a "reliable unconnected" (FI_RDM) style communication, in which DQP mappings are performed automatically (and invisibly) by the library. One reason for this approach is because the various MPI implementations expect such FI_RDM capabilities from libfabric. However, DQPs are more akin to a "connected" model or style (i.e., in which an initial connection setup step is required). The provider must therefore hide this connection model to implement FI_RDM communication.

However, hiding this control from the user may be a disadvantage in some scenarios. For example, as referenced supra, a system which uses a hybrid of connected and unconnected communication (e.g., over Infiniband) may be employed. Since Infiniband offers such control, the optimal combination of connected and unconnected model attributes are readily determined when the model is not hidden. As such, one alternate configuration contemplated herein is to implement both connected and unconnected models (including allowing the user to choose, if desired), and/or use of both models simultaneously.

SRQ Bounce Buffer—

Some exemplary embodiments of the disclosed design call for direct user access to SRQs. The result of this requirement is that the user must poll many queues. It also means a relatively large amount of memory is needed for SRQs.

As such, another option for managing SRQ access includes use of a "bounce step" (managed by e.g., the kernel, or a trusted process) that consolidates incoming messages on node-to-node queues (e.g., the ntb_transport queue pairs) into a single (or reduced number of) incoming queue(s) for each endpoint. In one implementation, an entity (e.g., software process operative on the endpoint node or another device, or even hardware) scans each of the per-node queue pairs and copies each message into a per-endpoint RX queue. The endpoint then needs to scan only a single queue, comprised of messages from many different nodes.

Advantageously, this approach reduces memory usage significantly over the direct user access methodology discussed above. Offload of this process, either to e.g., a dedicated CPU or to hardware, can significantly reduce polling time for endpoints.

In one particular configuration, "backpressure" data is provided to the sender in effect to provide flow feedback or control. For instance, the final endpoint buffer may be full even though the intermediate bounce buffer is empty. A sender can therefore fill the intermediate buffer (and as a result block communication for all endpoints that use it), because a single endpoint is not servicing requests quickly enough. Endpoint-specific backpressure data, provided specifically for that endpoint (as contrasted with all endpoints on the node), can be used to alleviate this issue.

A similar procedure (with a dedicated queue draining task) could also be used for TX processes. That is, in one embodiment, a sending process enqueues a send request on a local queue, which is emptied by a kernel task, trusted process, or hardware. Notably, if a CPU core or hardware thread can be devoted to this task, the latency of SRQ sends could be significantly reduced (because no transition to the kernel would be needed). However, while use of a dedicated thread to drain queues improves latency (e.g., for a microbenchmark), such threads may compete with user threads being executed by the CPU(s), and as such may reduce performance. Accordingly, in some embodiments, mechanisms are utilized to determine whether such "competition" exists (e.g., determining CPU utilization).

Unilateral DQP Assignment—

Exemplary embodiments of the disclosed design may utilize a handshake mechanism when assigning DQPs. This approach, however, incurs latency for the first DQP operation between endpoints.

As such, one alternate method that may be utilized is to assign one or more DQPs (e.g., a block of DQPs) to each peer node, and grant the node exclusive control of this block. In this way, the send-side kernel may unilaterally assign DQPs from its block, thereby reducing setup latency.

Dynamically Created DQPs—

Exemplary embodiments of this design call for a static number of DQPs. It would also be possible to dynamically create additional DQPs as needed. In such a case, the user might map an overlarge virtual region which is populated with additional DQPs as needed. This could better accommodate different communication patterns, which may use more DQPs than the static allocation provides. It may even make a DQP-only solution possible (i.e., eliminate the need for SRQs). However, it introduces additional complexity.

Full TX Queue Buffering—

It will be appreciated that while exemplary embodiments of the disclosed design call for transmitter to "spin" on a full TX queue, waiting for the receive side to make room, other options may be utilized consistent with the disclosure. For example, one such alternate includes use of memory allocation (malloc( ) space) to hold the message that cannot yet be sent, and move on to other computations. Such buffered transmissions can in one approach be sent first when space is available. In one implementation, a timer is used in conjunction with the allocation to periodically retry the buffer transmit operations, whether according to a periodic, aperiodic, or event-driven schedule (e.g., at regular prescribed intervals, dynamically varying intervals (such as due to a random backoff counter, a periodicity which increases or decreases as a function of tries, or yet other schemes which will be recognized by those of ordinary skill given the present disclosure).

Sharing UMCs—

While exemplary embodiments described herein are generally focused on one-to-one mapping of a UMC to an endpoint, it is recognized that allowing multiple endpoints to share a single UMC can provide better memory utilization (and possibly better CPU utilization, since fewer queues need to be scanned). One adaptation in support of such functionality relates to the libfabric API. The "shared context" model does not map trivially to the way UMCs are shared. Further, there is no built-in way to share libfabric contexts between processes (unlike, e.g., address vectors, which can be named and shared between processes).

While changes to the upstream API may be utilized to address such considerations, the present disclosure also contemplates creation of an "environment variable API", in which e.g., the LPP provider decides how UMCs should be shared, regardless of how the libfabric contexts are shared. For example, one might define variables FI_LPP_JOB_KEY and FI_LPP_UMC_EP_RATIO. All processes which share the same FI_LPP_JOB_KEY (and same user account) are eligible to share UMCs. The ratio of UMC to endpoints is controlled by FI_LPP_UMC_EP_RATIO; e.g., if that variable is "4", then 4 endpoints would share the same UMC. Finding an optimal ratio is in some embodiments found via profiling (at high ratios, the contention between many endpoints may become a bottleneck). The sharing of the UMC discussed above may also be accomplished invisibly to the user.

In another embodiment, libfabric shared contexts are mapped to UMC shared contexts, but only when possible. Case where such mapping may occur include the condition where e.g., two endpoints are bound to the same pair of libfabric contexts. This approach allows a reasonable implementation of sharing using the "vanilla" (unmodified) API and no environment variables. However, this approach also may be limited to sharing within a single process.

ADDITIONAL CONSIDERATIONS

It will be appreciated that The mechanisms and architectures described herein are accordingly equally applicable, with similar advantages, whether the components used to build the fabric supports the PCIe protocol, the Gen-Z protocol, or both or another protocol.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:
1. A computerized apparatus, comprising:
  data processor apparatus;
  at least one data interface in data communication with the data processor apparatus; and
  a storage device in data communication with the data processor apparatus, the storage device comprising at least one computer program configured to, when executed by the data processor apparatus, cause the computerized apparatus to:
    generation of data specific to a first type of operation;
    queueing of a first message in a first queue of the computerized apparatus, the first message comprising data descriptive of a data structure;
    transmission of a second message from the computerized apparatus to a second computerized apparatus, the second message configured to enable the second computerized apparatus to perform a device-specific system call;
    receipt, at the computerized apparatus, of data comprising (i) an address of a second data structure, and (ii) at least part of the data specific to the first type of operation;
    validation of the received data based at least on the received at least part of the data specific to the first type of operation; and
    based at least on the validation, cause performance of a storage access operation using at least a kernel of the computerized apparatus.

2. The computerized apparatus of claim 1, wherein:
  the first type of operation comprises a transmit operation; and
  the data structure comprises a transmit buffer of the computerized apparatus.

3. The computerized apparatus of claim 2, wherein the second data structure comprises a receive buffer of the second computerized apparatus.

4. The computerized apparatus of claim 1, wherein the computerized apparatus is in data communication with the second computerized apparatus via at least a PCIe (Peripheral Component Interconnect express) compliant data fabric.

5. The computerized apparatus of claim 1, further comprising:
  at least one UMC (user message context) comprising at least one TX (transmit) queue and at least one RX (receive) queue; and
  at least one KMC (kernel message context) comprising at least one TX queue;
  wherein the at least one TX queue and at least one RX queue of the at least one UMC can be read from, and written to, directly from user space.

6. The computerized apparatus of claim 5, wherein the first queue comprises the at least one TX (transmit) queue.

7. The computerized apparatus of claim 1, wherein:
  the generation of the data specific to the first type of operation comprises generating a key; and
  the queueing of the first message comprises queueing a message on a user-to-kernel queue comprising (i) at least one of a buffer address or length, and (ii) the generated key.

8. The computerized apparatus of claim 7, wherein:
  the device-specific system call comprises an ioctl operation; and
  the receipt, at the computerized apparatus, of data comprising (i) the address of the second data structure, and (ii) the at least part of the data specific to the first type of operation, comprises receiving, at the kernel of the computerized apparatus, the data comprising (i) and (ii) sent by a kernel of the second computerized apparatus.

9. The computerized apparatus of claim 1, wherein the causation of the performance of the storage access operation using at least the kernel of the computerized apparatus comprises causation of performance of a DMA (direct memory access) operation using at least the kernel of the computerized apparatus.

10. The computerized apparatus of claim 9, wherein the performance of the DMA operation comprises:
  use of the kernel of the computerized apparatus to initiate the DMA operation from a source to a destination;
  use of the kernel of the computerized apparatus to receive a DMA completion notification; and
  use of the kernel of the computerized apparatus to write a DMA completion event on a kernel-to-user queue of the computerized apparatus.

11. The computerized apparatus of claim 10, wherein the at least one computer program is further configured to, when executed by the data processor apparatus, cause the kernel of the computerized apparatus to transmit a message to a kernel of a second computerized apparatus, the transmitted message configured to cause the kernel of the second computerized apparatus to write an event on at least one queue of the second computerized apparatus.

12. A method of providing at least inter-process communication within a networked topology comprising a plurality of computerized nodes interconnected via at least a data network fabric, the method comprising:
    queueing and causing transaction of data messages at least between any two of the plurality of computerized nodes using at least one UMC (user message context) associated with each of the any two of the plurality of computerized nodes;
    wherein the queueing and the causing of the transaction of the data messages occurs without requiring transition of one or more user processes associated with the any two of the plurality of computerized nodes transitioning to a respective kernel thereof.

13. The method of claim 12, wherein:
    the at least one UMC associated with each of the any two of the plurality of computerized nodes each comprise at least one TX (transmit) queue and at least one RX (receive) queue; and
    the method further comprising notifying the one or more user processes of the any two of the plurality of computerized nodes, respectively, of a presence of one of more of the data messages in one or more of the at least one TX queue or the at least one RX queue without use of polling, the polling that requires the one or more user processes to transition to their respective kernel.

14. The method of claim 12, wherein the queueing and causing of the transaction of the data messages at least between the any two of the plurality of computerized nodes further comprises using at least one KMC (kernel message context) associated with respective ones of the any two of the plurality of computerized nodes, wherein one or more TX queues of the at least one KMC are written from the kernel of the respective computerized node such that one or more access operations can be arbitrated between at least two unrelated processes.

15. The method of claim 12, wherein the plurality of computerized nodes comprises at least one hundred (100) computerized nodes.

16. Computer readable apparatus comprising a non-transitory storage medium, the non-transitory storage medium comprising at least one computer program having a plurality of instructions, the plurality of instructions configured to, when executed on a processing apparatus, cause a computerized apparatus to:
    provide inter-process communication within a networked topology comprising at least two computerized nodes interconnected via at least a data network fabric, the provision of the inter-process communication comprising:
    a queueing and transaction of data messages between the at least two of computerized nodes via use of at least one UMC (user message context), the queueing and the transaction of the data messages occurring without requiring transition of one or more user processes associated with the at least two computerized nodes to a respective kernel of the at least two computerized nodes.

17. The computer readable apparatus of claim 16, wherein:
    the at least one UMC comprises at least one TX (transmit) queue and at least one RX (receive) queue; and
    the plurality of instructions are further configured to, when executed on the processing apparatus, cause the computerized apparatus to:
    transmit data representative of at least one notification to the one or more user processes, the data representative of the at least one notification indicative of a presence of one of more of the data messages in one or more of the at least one TX queue or the at least one RX queue without use of polling that requires the one or more user processes to transition to their respective kernel.

18. The computer readable apparatus of claim 16, wherein the queueing and the transaction of the data messages between the at least two computerized nodes further comprises utilization of at least one second KMC, wherein one or more TX queues of the at least one second KMC are written from the kernel of the respective computerized node such that one or more access operations can be arbitrated between at least two unrelated processes.

19. The computer readable apparatus of claim 16, wherein the at least two computerized nodes comprise at least one hundred (100) computerized nodes.

* * * * *